(12) United States Patent
Ellwood, Jr.

(10) Patent No.: US 7,099,547 B2
(45) Date of Patent: Aug. 29, 2006

(54) APPARATUS, METHOD, AND COMPUTER PROGRAM PRODUCT FOR STRUCTURED WAVEGUIDE TRANSPORT USING MICROBUBBLES

(75) Inventor: Sutherland C. Ellwood, Jr., Clinton Corners, NY (US)

(73) Assignee: Panorama Labs PTY LTD, Perth (AU)

( * ) Notice: Subject to any disclaimer, the term of this patent is extended or adjusted under 35 U.S.C. 154(b) by 0 days.

(21) Appl. No.: 10/906,257

(22) Filed: Feb. 11, 2005

(65) Prior Publication Data
US 2005/0201702 A1    Sep. 15, 2005

Related U.S. Application Data

(63) Continuation-in-part of application No. 10/906,220, filed on Feb. 9, 2005, and a continuation-in-part of application No. 10/906,221, filed on Feb. 9, 2005, and a continuation-in-part of application No. 10/906,222, filed on Feb. 9, 2005, and a continuation-in-part of application No. 10/906,223, filed on Feb. 9, 2005, and a continuation-in-part of application No. 10/906,224, filed on Feb. 9, 2005, and a continuation-in-part of application No. 10/906,225, filed on Feb. 9, 2005, and a continuation-in-part of application No. 10/906,226, filed on Feb. 9, 2005, and a continuation-in-part of application No. 11/011,761, filed on Dec. 14, 2004, and a continuation-in-part of application No. 11/011,751, filed on Dec. 14, 2004, and a continuation-in-part of application No. 11/011,496, filed on Dec. 14, 2004, and a continuation-in-part of application No. 11/011,762, filed on Dec. 14, 2004, and a continuation-in-part of application No. 11/011,770, filed on Dec. 14, 2004, and a continuation-in-part of application No. 10/812,294, filed on Mar. 29, 2004, and a continuation-in-part of application No. 10/811,782, filed on Mar. 29, 2004, and a continuation-in-part of application No. 10/812,295, filed on Mar. 29, 2004.

(60) Provisional application No. 60/544,591, filed on Feb. 12, 2004.

(51) Int. Cl.
G02B 6/032    (2006.01)
G02B 6/27    (2006.01)

(52) U.S. Cl. .......................................... 385/125; 385/11

(58) Field of Classification Search .................... None
See application file for complete search history.

(56) References Cited

U.S. PATENT DOCUMENTS 2,072,419 A    3/1937    Birch-Field

OTHER PUBLICATIONS

D. Budker et al., Resonant Magneto-Optical Rotation: New Twists in an Old Plot [online], [retrieved on Mar. 29, 2006]. Retrieved from the Internet < URL: http://ist-socrates.berkeley.edu/-budker/papers/ResonantFaradayPaper/resFar.pdf>.*

*Primary Examiner*—Sung Pak
*Assistant Examiner*—Omar Rojas
(74) *Attorney, Agent, or Firm*—Patent Law Offices of Michael E. Woods

(57) ABSTRACT

An apparatus and method for a transport. The transport including a waveguide including a guiding region and one or more bounding regions for enhancing containment of transmitted radiation within the guiding region, a portion of the waveguide defining a plurality of voids; and a gas disposed in the plurality of voids to enhance an influencer response attribute of the waveguide. A method of operating the transport includes: a) propagating a radiation signal through a waveguide including a guiding region and one or more bounding regions for enhancing containment of transmitted radiation within the guiding region, a portion of the waveguide defining a plurality of voids; and b) enhancing a response of the radiation signal to an influencer applying an influence on the waveguide using a gas disposed in the plurality of voids.

9 Claims, 7 Drawing Sheets

U.S. PATENT DOCUMENTS

| | | | |
|---|---|---|---|
| 3,289,001 A | 11/1966 | Wilcox | |
| 3,701,131 A | 10/1972 | Brauser et al. | |
| 3,756,690 A * | 9/1973 | Borrelli et al. | 385/1 |
| 3,811,096 A | 5/1974 | Dillon, Jr., et al. | |
| 4,476,465 A | 10/1984 | Anderson | |
| 4,500,176 A | 2/1985 | MacNeal | |
| 4,575,722 A | 3/1986 | Anderson | |
| 4,578,651 A | 3/1986 | Heitmann et al. | |
| 4,584,237 A | 4/1986 | Pulliam | |
| 4,609,257 A | 9/1986 | Shirasaki | |
| 4,661,809 A | 4/1987 | Anderson et al. | |
| 4,893,909 A | 1/1990 | Hansen et al. | |
| 4,966,445 A | 10/1990 | Takeda | |
| 4,981,341 A | 1/1991 | Brandle, Jr. et al. | |
| 5,031,983 A | 7/1991 | Dillon, Jr. et al. | |
| 5,048,937 A | 9/1991 | Takeda et al. | |
| 5,050,968 A | 9/1991 | Ohara | |
| 5,052,786 A | 10/1991 | Schulz | |
| 5,053,704 A | 10/1991 | Fitzpatrick | |
| 5,056,885 A | 10/1991 | Chinn | |
| 5,058,971 A | 10/1991 | Schmitt et al. | |
| 5,076,675 A | 12/1991 | Kusaka et al. | |
| 5,273,622 A | 12/1993 | Jacobsen | |
| 5,408,565 A | 4/1995 | Levy et al. | |
| 5,473,466 A | 12/1995 | Tanielian et al. | |
| 5,598,492 A | 1/1997 | Hammer | |
| 5,619,355 A | 4/1997 | Sharp et al. | |
| 5,640,021 A | 6/1997 | Lee et al. | |
| 5,739,943 A | 4/1998 | Ohshima et al. | |
| 5,790,299 A | 8/1998 | Wilson et al. | |
| 5,802,222 A | 9/1998 | Rasch et al. | |
| 5,812,304 A | 9/1998 | Shirasaki et al. | |
| 5,844,710 A | 12/1998 | Fukushima | |
| 5,867,300 A | 2/1999 | Onaka et al. | |
| 5,889,609 A | 3/1999 | Fukushima | |
| 5,901,258 A | 5/1999 | Nuang | |
| 5,973,821 A | 10/1999 | Onaka et al. | |
| 5,990,996 A | 11/1999 | Sharp | |
| 6,018,412 A | 1/2000 | Fukushima | |
| 6,103,010 A | 8/2000 | Belouet | |
| 6,208,795 B1 | 3/2001 | Nakano et al. | |
| 6,314,215 B1 | 11/2001 | Shay et al. | |
| 6,333,806 B1 | 12/2001 | Onaka et al. | |
| 6,339,492 B1 | 1/2002 | Terahara et al. | |
| 6,417,892 B1 | 7/2002 | Sharp et al. | |
| 6,441,944 B1 | 8/2002 | Kim et al. | |
| 6,462,856 B1 | 10/2002 | Marcuse et al. | |
| 6,467,313 B1 | 10/2002 | Chu et al. | |
| 6,496,634 B1 * | 12/2002 | Levenson | 385/125 |
| 6,532,774 B1 | 3/2003 | Zhang et al. | |
| 6,542,647 B1 | 4/2003 | Minemoto et al. | |
| 6,577,430 B1 | 6/2003 | Jin et al. | |
| 6,580,546 B1 | 6/2003 | Liu et al. | |
| 6,594,068 B1 | 7/2003 | Sui | |
| 6,631,234 B1 | 10/2003 | Russell et al. | |
| 6,654,522 B1 | 11/2003 | Chandalia et al. | |
| 6,757,101 B1 | 6/2004 | Jin et al. | |
| 6,762,872 B1 | 7/2004 | Inoue et al. | |
| 6,782,148 B1 * | 8/2004 | Eggleton et al. | 385/11 |
| 6,813,076 B1 | 11/2004 | Okubo et al. | |
| 6,952,300 B1 | 10/2005 | Levy | |
| 2001/0010593 A1 | 8/2001 | Terahara et al. | |
| 2001/0023932 A1 | 9/2001 | Ohido et al. | |
| 2001/0032940 A1 | 10/2001 | Iwatsuka | |
| 2001/0038740 A1 * | 11/2001 | Hasegawa et al. | 385/123 |
| 2002/0003651 A1 | 1/2002 | Sui | |
| 2002/0044710 A1 | 4/2002 | Hung | |
| 2002/0051279 A1 | 5/2002 | Minemoto et al. | |
| 2002/0063941 A1 | 5/2002 | Matsushita et al. | |
| 2002/0139974 A1 | 10/2002 | Matsushita et al. | |
| 2003/0031448 A1 | 2/2003 | Soljacic et al. | |
| 2004/0085614 A1 | 5/2004 | Elezzabi et al. | |

* cited by examiner

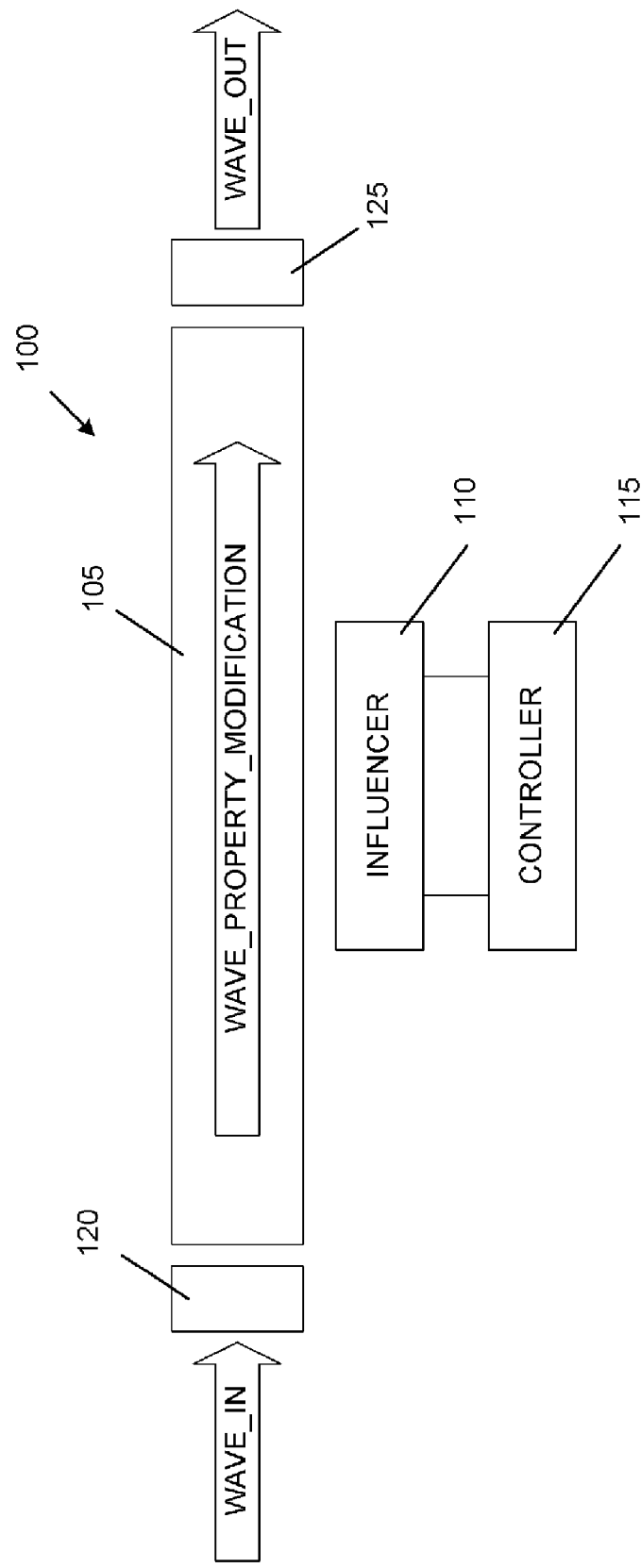

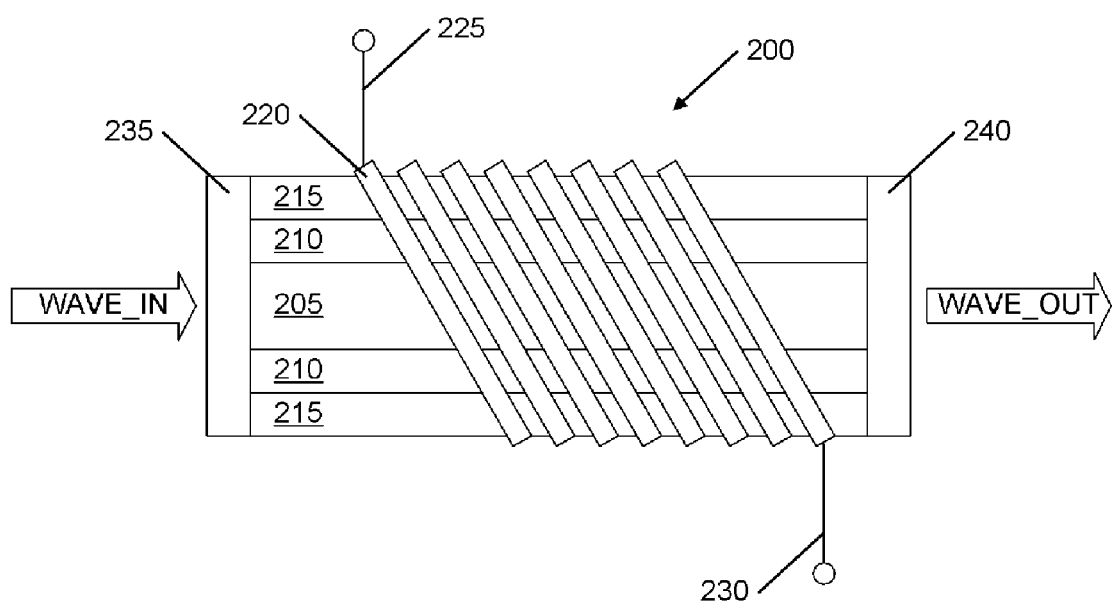
FIG_2
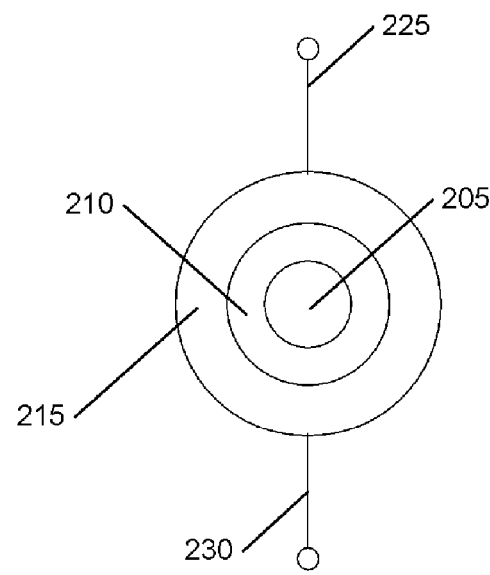
FIG_3

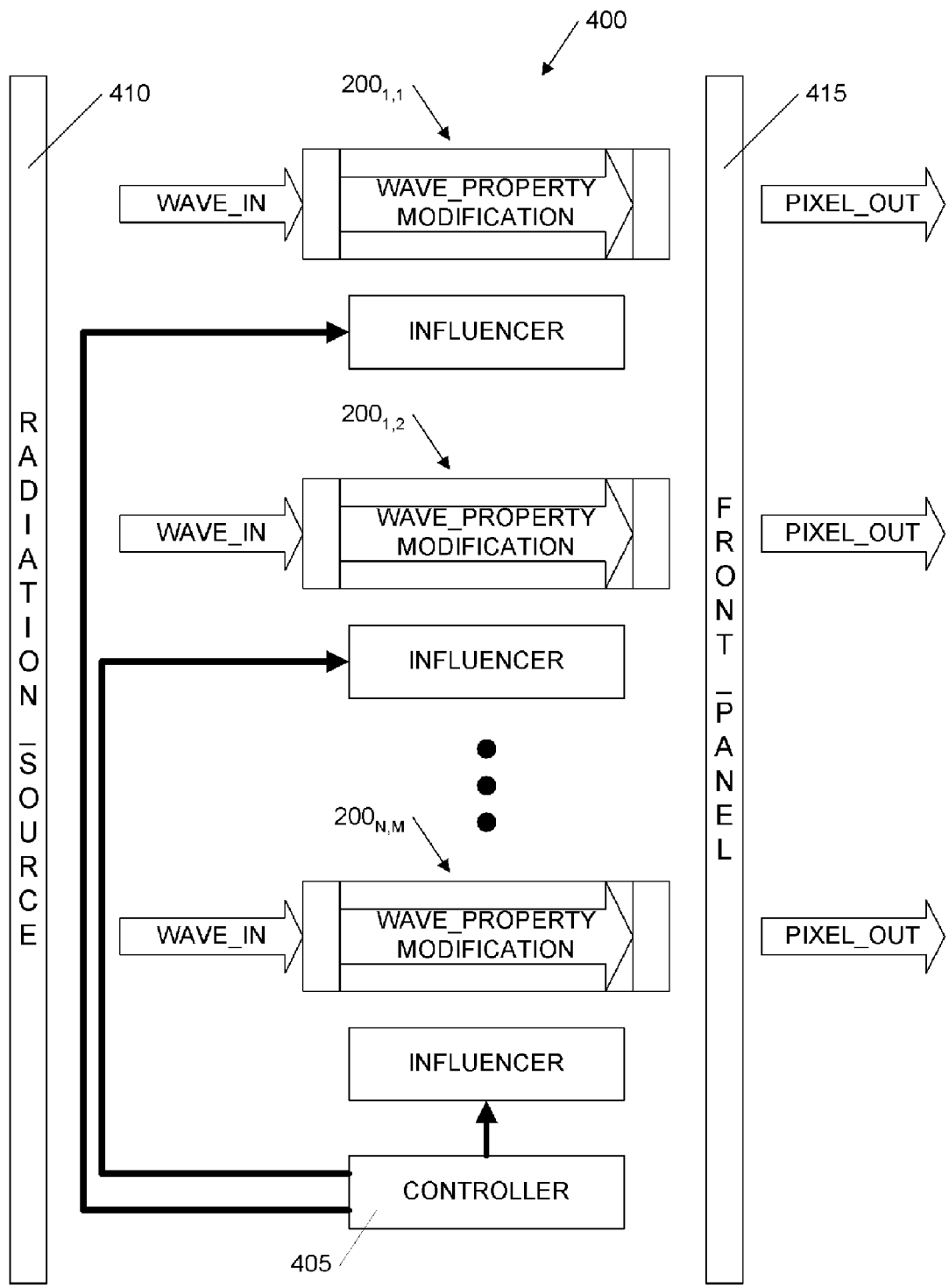
FIG_4

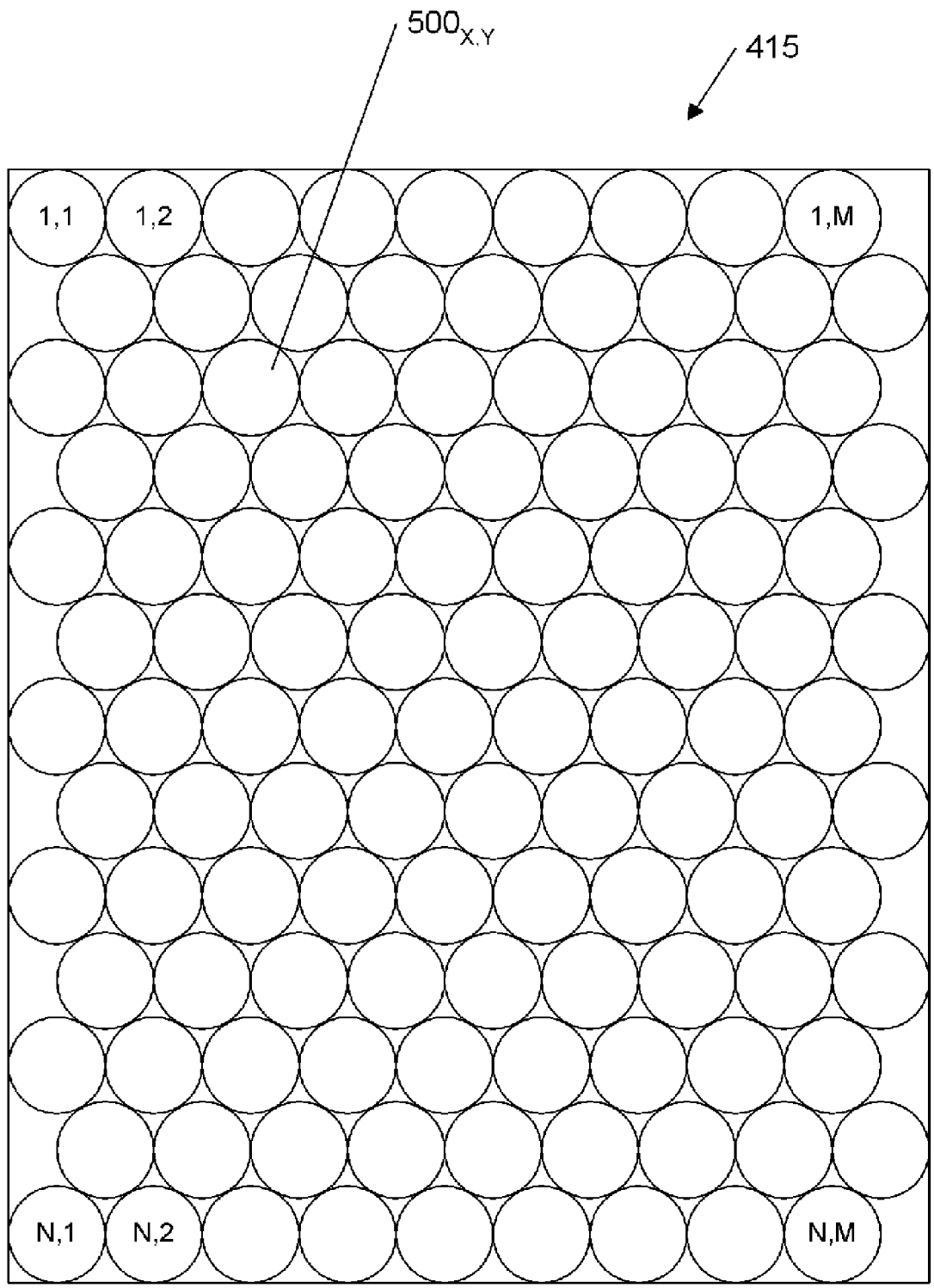
FIG_5

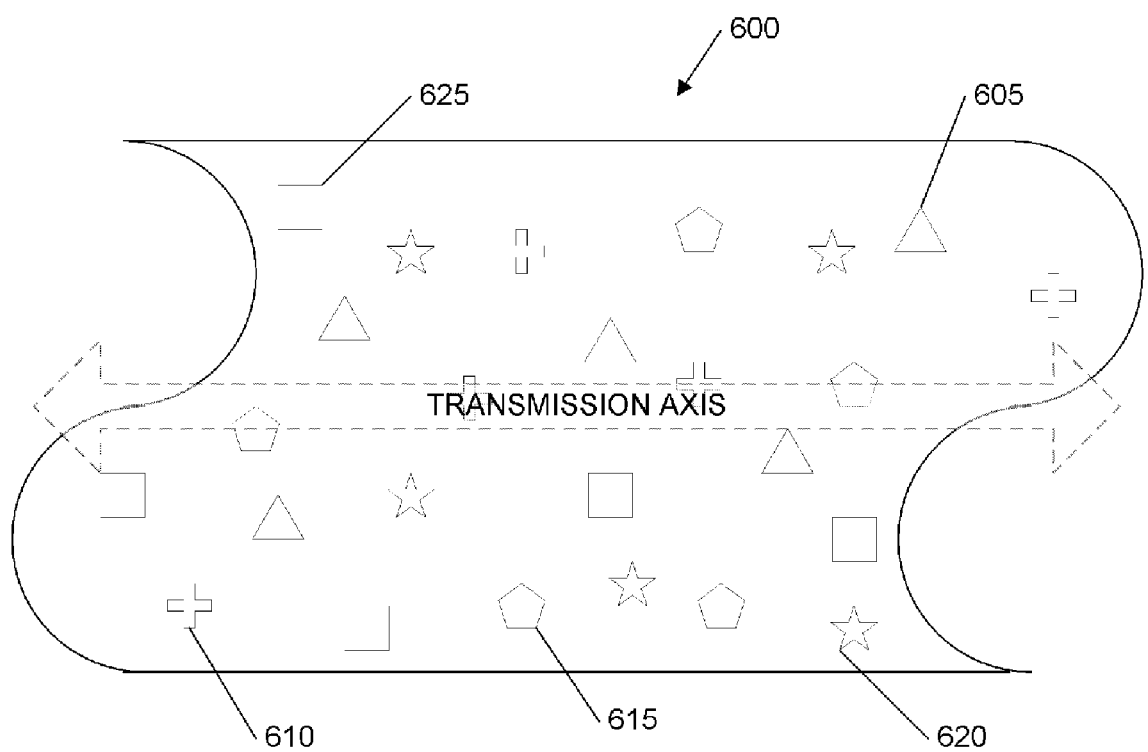
FIG_6

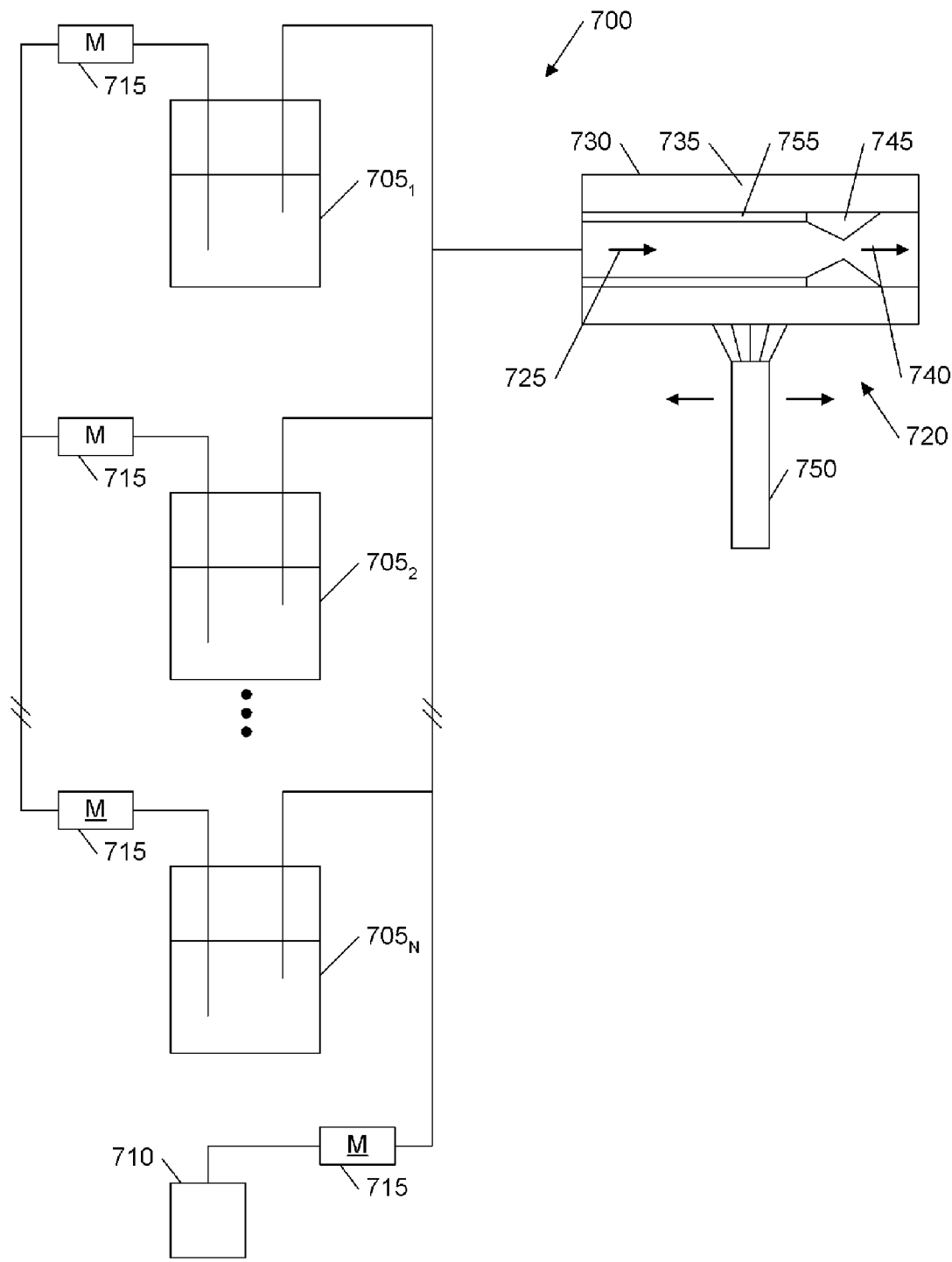
FIG_7

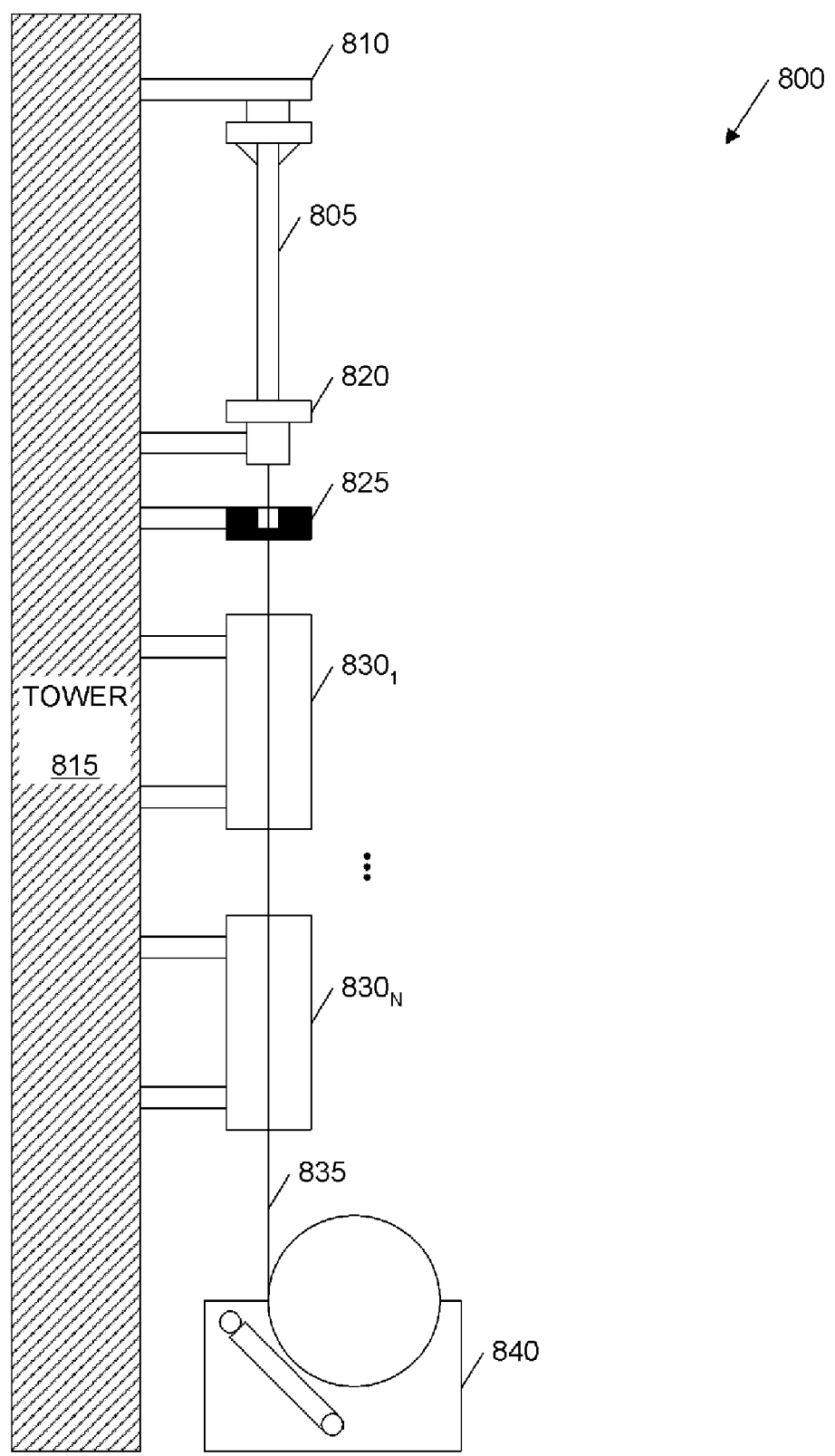
FIG_8

APPARATUS, METHOD, AND COMPUTER PROGRAM PRODUCT FOR STRUCTURED WAVEGUIDE TRANSPORT USING MICROBUBBLES

CROSS-REFERENCE TO RELATED APPLICATIONS

This application claims benefit of U.S. Provisional Application No. 60/544,591 filed 12 Feb. 2004, and is a Continuation-In-Part of each of the following U.S. patent application Ser. Nos. 10/812,294, 10/811,782, and 10/812,295 (each filed 29 Mar. 2004); and is a Continuation-In-Part of each of the following U.S. patent application Ser. Nos. 11/011,761, 11/011,751, 11/011,496, 11/011,762, and 11/011,770 (each filed 14 Dec. 2004); and is a Continuation-In-Part of each of the following U.S. patent application Ser. Nos. 10/906,220, 10/906,221, 10/906,222, 10/906,223, 10/906,224, 10/906,225, and 10/906,226 (each filed 9 Feb. 2005). The disclosures of which are each incorporated in their entireties for all purposes.

BACKGROUND OF THE INVENTION

The present invention relates generally to a transport for propagating radiation, and more specifically to a waveguide having a guiding channel that includes optically-active constituents that enhance a responsiveness of a radiation-influencing property of the waveguide to an outside influence.

The Faraday Effect is a phenomenon wherein a plane of polarization of linearly polarized light rotates when the light is propagated through a transparent medium placed in a magnetic field and in parallel with the magnetic field. An effectiveness of the magnitude of polarization rotation varies with the strength of the magnetic field, the Verdet constant inherent to the medium and the light path length. The empirical angle of rotation is given by $$\beta = VBd, \qquad (Eq. 1)$$

where V is called the Verdet constant (and has units of arc minutes cm-1 Gauss-1), B is the magnetic field and d is the propagation distance subject to the field. In the quantum mechanical description, Faraday rotation occurs because imposition of a magnetic field alters the energy levels.

It is known to use discrete materials (e.g., iron-containing garnet crystals) having a high Verdet constant for measurement of magnetic fields (such as those caused by electric current as a way of evaluating the strength of the current) or as a Faraday rotator used in an optical isolator. An optical isolator includes a Faraday rotator to rotate by 45° the plane of polarization, a magnet for application of magnetic field, a polarizer, and an analyzer. Conventional optical isolators have been of the bulk type wherein no waveguide (e.g., optical fiber) is used.

In conventional optics, magneto-optical modulators have been produced from discrete crystals containing paramagnetic and ferromagnetic materials, particularly garnets (yttrium/iron garnet for example). Devices such as these require considerable magnetic control fields. The magneto-optical effects are also used in thin-layer technology, particularly for producing non-reciprocal devices, such as non-reciprocal junctions. Devices such as these are based on a conversion of modes by Faraday Effect or by Cotton-Moutton effect.

A further drawback to using paramagnetic and ferromagnetic materials in magneto-optic devices is that these materials may adversely affect properties of the radiation other than polarization angle, such as for example amplitude, phase, and/or frequency.

The prior art has known the use of discrete magneto-optical bulk devices (e.g., crystals) for collectively defining a display device. These prior art displays have several drawbacks, including a relatively high cost per picture element (pixel), high operating costs for controlling individual pixels, increasing control complexity that does not scale well for relatively large display devices.

Conventional imaging systems may be roughly divided into two categories: (a) flat panel displays (FPDs), and (b) projection systems (which include cathode ray tubes (CRTs) as emissive displays). Generally speaking, the dominant technologies for the two types of systems are not the same, although there are exceptions. These two categories have distinct challenges for any prospective technology, and existing technologies have yet to satisfactorily conquer these challenges.

A main challenge confronting existing FPD technology is cost, as compared with the dominant cathode ray tube (CRT) technology ("flat panel" means "flat" or "thin" compared to a CRT display, whose standard depth is nearly equal to the width of the display area).

To achieve a given set of imaging standards, including resolution, brightness, and contrast, FPD technology is roughly three to four times more expensive than CRT technology. However, the bulkiness and weight of CRT technology, particularly as a display area is scaled larger, is a major drawback. Quests for a thin display have driven the development of a number of technologies in the FPD arena.

High costs of FPD are largely due to the use of delicate component materials in the dominant liquid crystal diode (LCD) technology, or in the less-prevalent gas plasma technology. Irregularities in the nematic materials used in LCDs result in relatively high defect rates; an array of LCD elements in which an individual cell is defective often results in the rejection of an entire display, or a costly substitution of the defective element.

For both LCD and gas-plasma display technology, the inherent difficulty of controlling liquids or gasses in the manufacturing of such displays is a fundamental technical and cost limitation.

An additional source of high cost is the demand for relatively high switching voltages at each light valve/emission element in the existing technologies. Whether for rotating the nematic materials of an LCD display, which in turn changes a polarization of light transmitted through the liquid cell, or excitation of gas cells in a gas plasma display, relatively high voltages are required to achieve rapid switching speeds at the imaging element. For LCDs, an "active matrix," in which individual transistor elements are assigned to each imaging location, is a high-cost solution.

As image quality standards increase, for high-definition television (HDTV) or beyond, existing FPD technologies cannot now deliver image quality at a cost that is competitive with CRT's. The cost differential at this end of the quality range is most pronounced. And delivering 35 mm film-quality resolution, while technically feasible, is expected to entail a cost that puts it out of the realm of consumer electronics, whether for televisions or computer displays.

For projection systems, there are two basic subclasses: television (or computer) displays, and theatrical motion picture projection systems. Relative cost is a major issue in the context of competition with traditional 35 mm film projection equipment. However, for HDTV, projection systems represent the low-cost solution, when compared against conventional CRTs, LCD FPDs, or gas-plasma FPDs.

Current projection system technologies face other challenges. HDTV projection systems face the dual challenge of minimizing a depth of the display, while maintaining uniform image quality within the constraints of a relatively short throw-distance to the display surface. This balancing typically results in a less-than-satisfactory compromise at the price of relatively lower cost.

A technically-demanding frontier for projection systems, however, is in the domain of the movie theater. Motion-picture screen installations are an emerging application area for projection systems, and in this application, issues regarding console depth versus uniform image quality typically do not apply. Instead, the challenge is in equaling (at minimum) the quality of traditional 35 mm film projectors, at a competitive cost. Existing technologies, including direct Drive Image Light Amplifier ("D-ILA"), digital light processing ("DLP"), and grating-light-valve ("GLV")-based systems, while recently equaling the quality of traditional film projection equipment, have significant cost disparities as compared to traditional film projectors.

Direct Drive Image Light Amplifier is a reflective liquid crystal light valve device developed by JVC Projectors. A driving integrated circuit ("IC") writes an image directly onto a CMOS based light valve. Liquid crystals change the reflectivity in proportion to a signal level. These vertically aligned (homeoptropic) crystals achieve very fast response times with a rise plus fall time less than 16 milliseconds. Light from a xenon or ultra high performance ("UHP") metal halide lamp travels through a polarized beam splitter, reflects off the D-ILA device, and is projected onto a screen.

At the heart of a DLP™ projection system is an optical semiconductor known as a Digital Micromirror Device, or DMD chip, which was pioneered by Dr. Larry Hornbeck of Texas Instruments in 1987. The DMD chip is a sophisticated light switch. It contains a rectangular array of up to 1.3 million hinge-mounted microscopic mirrors; each of these micromirrors measures less than one-fifth the width of a human hair, and corresponds to one pixel in a projected image. When a DMD chip is coordinated with a digital video or graphic signal, a light source, and a projection lens, its mirrors reflect an all-digital image onto a screen or other surface. The DMD and the sophisticated electronics that surround it are called Digital Light Processing™ technology.

A process called GLV (Grating-Light-Valve) is being developed. A prototype device based on the technology achieved a contrast ratio of 3000:1 (typical high-end projection displays today achieve only 1000:1). The device uses three lasers chosen at specific wavelengths to deliver color. The three lasers are: red (642 nm), green (532 nm), and blue (457 nm). The process uses MEMS technology (MicroElectroMechanical) and consists of a microribbon array of 1,080 pixels on a line. Each pixel consists of six ribbons, three fixed and three which move up/down. When electrical energy is applied, the three mobile ribbons form a kind of diffraction grating which "filters" out light.

Part of the cost disparity is due to the inherent difficulties those technologies face in achieving certain key image quality parameters at a low cost. Contrast, particularly in quality of "black," is difficult to achieve for micro-mirror DLP. GLV, while not facing this difficulty (achieving a pixel nullity, or black, through optical grating wave interference), instead faces the difficulty of achieving an effectively film-like intermittent image with a line-array scan source.

Existing technologies, either LCD or MEMS-based, are also constrained by the economics of producing devices with at least 1 K×1 K arrays of elements (micro-mirrors, liquid crystal on silicon ("LCoS"), and the like). Defect rates are high in the chip-based systems when involving these numbers of elements, operating at the required technical standards.

It is known to use stepped-index optical fibers in cooperation with the Faraday Effect for various telecommunications uses. The telecommunications application of optical fibers is well-known, however there is an inherent conflict in applying the Faraday Effect to optical fibers because the telecommunications properties of conventional optical fibers relating to dispersion and other performance metrics are not optimized for, and in some cases are degraded by, optimizations for the Faraday Effect. In some conventional optical fiber applications, ninety-degree polarization rotation is achieved by application of a one hundred Oersted magnetic field over a path length of fifty-four meters. Placing the fiber inside a solenoid and creating the desired magnetic field by directing current through the solenoid applies the desired field. For telecommunications uses, the fifty-four meter path length is acceptable when considering that it is designed for use in systems having a total path length measured in kilometers.

Another conventional use for the Faraday Effect in the context of optical fibers is as a system to overlay a low-rate data transmission on top of conventional high-speed transmission of data through the fiber. The Faraday Effect is used to slowly modulate the high-speed data to provide out-of-band signaling or control. Again, this use is implemented with the telecommunications use as the predominate consideration.

In these conventional applications, the fiber is designed for telecommunications usage and any modification of the fiber properties for participation in the Faraday Effect is not permitted to degrade the telecommunications properties that typically include attenuation and dispersion performance metrics for kilometer+–length fiber channels.

Once acceptable levels were achieved for the performance metrics of optical fibers to permit use in telecommunications, optical fiber manufacturing techniques were developed and refined to permit efficient and cost-effective manufacturing of extremely long-lengths of optically pure and uniform fibers. A high-level overview of the basic manufacturing process for optical fibers includes manufacture of a perform glass cylinder, drawing fibers from the preform, and testing the fibers. Typically a perform blank is made using a modified chemical vapor deposition (MCVD) process that bubbles oxygen through silicon solutions having a requisite chemical composition necessary to produce the desired attributes (e.g., index of refraction, coefficient of expansion, melting point, etc.) of the final fiber. The gas vapors are conducted to an inside of a synthetic silica or quartz tube (cladding) in a special lathe. The lathe is turned and a torch moves along an outside of the tube. Heat from the torch causes the chemicals in the gases to react with oxygen and form silicon dioxide and germanium dioxide and these dioxides deposit on the inside of the tube and fuse together to form glass. The conclusion of this process produces the blank preform.

After the blank preform is made, cooled, and tested, it is placed inside a fiber drawing tower having the preform at a top near a graphite furnace. The furnace melts a tip of the preform resulting in a molten "glob" that begins to fall due to gravity. As it falls, it cools and forms a strand of glass. This strand is threaded through a series of processing stations for applying desired coatings and curing the coatings and attached to a tractor that pulls the strand at a computer-monitored rate so that the strand has the desired thickness. Fibers are pulled at about a rate of thirty-three to sixty-six feet/second with the drawn strand wound onto a spool. It is not uncommon for these spools to contain more than one point four (1.4) miles of optical fiber.

This finished fiber is tested, including tests for the performance metrics. These performance metrics for telecommunications grade fibers include: tensile strength (100,000 pounds per square inch or greater), refractive index profile (numerical aperture and screen for optical defects), fiber geometry (core diameter, cladding dimensions and coating diameters), attenuation (degradation of light of various wavelengths over distance), bandwidth, chromatic dispersion, operating temperature/range, temperature dependence on attenuation, and ability to conduct light underwater.

In 1996, a variation of the above-described optical fibers was demonstrated that has since been termed photonic crystal fibers (PCFs). A PCF is an optical fiber/waveguiding structure that uses a microstructured arrangement of low-index material in a background material of higher refractive index. The background material is often undoped silica and the low index region is typically provided by air voids running along the length of the fiber. PCFs are divided into two general categories: (1) high index guiding fibers, and (2) low index guiding fibers.

Similar to conventional optic fibers described previously, high index guiding fibers are guiding light in a solid core by the Modified Total Internal Reflection (MTIR) principle. Total internal reflection is caused by the lower effective index in the microstructured air-filled region.

Low index guiding fibers guide light using a photonic bandgap (PBG) effect. Light is confined to the low index core as the PBG effect makes propagation in the microstructured cladding region impossible.

While the term "conventional waveguide structure" is used to include the wide range of waveguiding structures and methods, the range of these structures may be modified as described herein to implement embodiments of the present invention. The characteristics of different fiber types aides are adapted for the many different applications for which they are used. Operating a fiber optic system properly relies on knowing what type of fiber is being used and why.

Conventional systems include single-mode, multimode, and PCF waveguides, and also include many sub-varieties as well. For example, multimode fibers include step-index and graded-index fibers, and single-mode fibers include step-index, matched clad, depressed clad and other exotic structures. Multimode fiber is best designed for shorter transmission distances, and is suited for use in LAN systems and video surveillance. Single-mode fibers are best designed for longer transmission distances, making it suitable for long-distance telephony and multichannel television broadcast systems. "Air-clad" or evanescently-coupled waveguides include optical wire and optical nano-wire.

Stepped-index generally refers to provision of an abrupt change of an index of refraction for the waveguide—a core has an index of refraction greater than that of a cladding. Graded-index refers to structures providing a refractive index profile that gradually decreases farther from a center of the core (for example the core has a parabolic profile). Single-mode fibers have developed many different profiles tailored for particular applications (e.g., length and radiation frequency(ies) such as non dispersion-shifted fiber (NDSF), dispersion-shifted fiber (DSF) and non-zero-dispersion-shifted fiber (NZ-DSF)). An important variety of single-mode fiber has been developed referred to as polarization-maintaining (PM) fiber. All other single-mode fibers discussed so far have been capable of carrying randomly polarized light. PM fiber is designed to propagate only one polarization of the input light. PM fiber contains a feature not seen in other fiber types. Besides the core, there are additional (2) longitudinal regions called stress rods. As their name implies, these stress rods create stress in the core of the fiber such that the transmission of only one polarization plane of light is favored.

As discussed above, conventional magneto-optical systems, particularly Faraday rotators and isolators, have employed special magneto-optical materials that include rare earth doped garnet crystals and other specialty materials, commonly an yttrium-iron-garnet (YIG) or a bismuth-substituted YIG. A YIG single crystal is grown using a floating zone (FZ) method. In this method, $Y_2O_3$ and $Fe_2O_3$ are mixed to suit the stoichiometric composition of YIG, and then the mixture is sintered. The resultant sinter is set as a mother stick on one shaft in an FZ furnace, while a YIG seed crystal is set on the remaining shaft. The sintered material of a prescribed formulation is placed in the central area between the mother stick and the seed crystal in order to create the fluid needed to promote the deposition of YIG single crystal. Light from halogen lamps is focused on the central area, while the two shafts are rotated. The central area, when heated in an oxygenic atmosphere, forms a molten zone. Under this condition, the mother stick and the seed are moved at a constant speed and result in the movement of the molten zone along the mother stick, thus growing single crystals from the YIG sinter.

Since the FZ method grows crystal from a mother stick that is suspended in the air, contamination is precluded and a high-purity crystal is cultivated. The FZ method produces ingots measuring 012×120 mm.

Bi-substituted iron garnet thick films are grown by a liquid phase epitaxy (LPE) method that includes an LPE furnace. Crystal materials and a $PbO$—$B_2O_3$ flux are heated and made molten in a platinum crucible. Single crystal wafers, such as $(GdCa)_2(GaMgZr)_5O_{12}$, are soaked on the molten surface while rotated, which causes a Bi-substituted iron garnet thick film to be grown on the wafers. Thick films measuring as much as 3 inches in diameter can be grown.

To obtain 45° Faraday rotators, these films are ground to a certain thickness, applied with anti-reflective coating, and then cut into 1–2 mm squares to fit the isolators. Having a greater Faraday rotation capacity than YIG single crystals, Bi-substituted iron garnet thick films must be thinned in the order of 100 μm, so higher-precision processing is required.

Newer systems provide for the production and synthesis of Bismuth-substituted yttrium-iron-garnet (Bi—YIG) materials, thin-films and nanopowders. nGimat Co., at 5313 Peachtree Industrial Boulevard, Atlanta, Ga. 30341 uses a combustion chemical vapor deposition (CCVD) system for production of thin film coatings. In the CCVD process, precursors, which are the metal-bearing chemicals used to coat an object, are dissolved in a solution that typically is a combustible fuel. This solution is atomized to form microscopic droplets by means of a special nozzle. An oxygen stream then carries these droplets to a flame where they are combusted. A substrate (a material being coated) is coated by simply drawing it in front of the flame. Heat from the flame provides energy that is required to vaporize the droplets and for the precursors to react and deposit (condense) on the substrate.

Additionally, epitaxial liftoff has been used for achieving heterogeneous integration of many III-V and elemental semiconductor systems. However, it has been difficult using some processes to integrate devices of many other important material systems. A good example of this problem has been the integration of single-crystal transition metal oxides on semiconductor platforms, a system needed for on-chip thin film optical isolators. An implementation of epitaxial liftoff in magnetic garnets has been reported. Deep ion implantation is used to create a buried sacrificial layer in single-crystal yttrium iron garnet (YIG) and bismuth-substituted YIG (Bi—YIG) epitaxial layers grown on gadolinium gallium garnet (GGG). The damage generated by the implantation induces a large etch selectivity between the sacrificial layer and the rest of the garnet. Ten-micron-thick films have been lifted off from the original GGG substrates by etching in phosphoric acid. Millimeter-size pieces have been transferred to the silicon and gallium arsenide substrates.

Further, researchers have reported a multilayer structure they call a magneto-optical photonic crystal that displays one hundred forty percent (140%) greater Faraday rotation at 748 nm than a single-layer bismuth iron garnet film of the same thickness. Current Faraday rotators are generally single crystals or epitaxial films. The single-crystal devices, however, are rather large, making their use in applications such as integrated optics difficult. And even the films display thicknesses on the order of 500 μm, so alternative material systems are desirable. The use of stacked films of iron garnets, specifically bismuth and yttrium iron garnets has been investigated. Designed for use with 750-nm light, a stack featured four heteroepitaxial layers of 81-nm-thick yttrium iron garnet (YIG) atop 70-nm-thick bismuth iron garnet (BIG), a 279-nm-thick central layer of BIG, and four layers of BIG atop YIG. To fabricate the stack, a pulsed laser deposition using an LPX305i 248-nm KrF excimer laser was used.

As seen from the discussion above, the prior art employs specialty magneto-optic materials in most magneto-optic systems, but it has also been known to employ the Faraday Effect with less traditional magneto-optic materials such as the non-PCF optical fibers by creating the necessary magnetic field strength—as long as the telecommunications metrics are not compromised. In some cases, post-manufacturing methods are used in conjunction with pre-made optical fibers to provide certain specialty coatings for use in certain magneto-optical applications. The same is true for specialty magneto-optical crystals and other bulk implementations in that post-manufacture processing of the premade material is sometimes necessary to achieve various desired results. Such extra processing increases the final cost of the special fiber and introduces additional situations in which the fiber may fail to meet specifications. Since many magneto-applications typically include a small number (typically one or two) of magneto-optical components, the relatively high cost per unit is tolerable. However, as the number of desired magneto-optical components increases, the final costs (in terms of dollars and time) are magnified and in applications using hundreds or thousands of such components, it is imperative to greatly reduce unit cost.

What is needed is an alternative waveguide technology that offers advantages over the prior art to enhance a responsiveness of a radiation-influencing property of the waveguide to an outside influence while reducing unit cost and increasing manufacturability, reproducibility, uniformity, and reliability.

SUMMARY OF THE INVENTION

Disclosed is an apparatus and method for a transport. The transport including a waveguide including a guiding region and one or more bounding regions for enhancing containment of transmitted radiation within the guiding region, a portion of the waveguide defining a plurality of voids; and a gas disposed in the plurality of voids to enhance an influencer response attribute of the waveguide. A method of operating the transport includes: a) propagating a radiation signal through a waveguide including a guiding region and one or more bounding regions for enhancing containment of transmitted radiation within the guiding region, a portion of the waveguide defining a plurality of voids; and b) enhancing a response of the radiation signal to an influencer applying an influence on the waveguide using a gas disposed in the plurality of voids.

It is also a preferred embodiment of the present invention for a transport manufacturing method, the method including: a) forming a waveguide having a guiding region and one or more bounding regions for enhancing containment of transmitted radiation within the guiding region, a portion of the waveguide defining a plurality of voids; and b) disposing a gas in the plurality of voids to enhance an influencer response attribute of the waveguide.

The apparatus, method, computer program product and propagated signal of the present invention provide an advantage of using modified and mature waveguide manufacturing processes. In a preferred embodiment, the waveguide is an optical transport, preferably an optical fiber or waveguide channel adapted to enhance short-length property influencing characteristics of the influencer by including optically-active constituents while preserving desired attributes of the radiation. In a preferred embodiment, the property of the radiation to be influenced includes a polarization state of the radiation and the influencer uses a Faraday Effect to control a polarization rotation angle using a controllable, variable magnetic field propagated parallel to a transmission axis of the optical transport. The optical transport is constructed to enable the polarization to be controlled quickly using low magnetic field strength over very short optical paths. Radiation is initially controlled to produce a wave component having one particular polarization; the polarization of that wave component is influenced so that a second polarizing filter modulates an amplitude of emitted radiation in response to the influencing effect. In the preferred embodiment, this modulation includes extinguishing the emitted radiation. The incorporated patent applications, the priority applications and related-applications, disclose Faraday structured waveguides, Faraday structured waveguide modulators, displays and other waveguide structures and methods that are cooperative with the present invention.

Leveraging the mature and efficient fiber optic waveguide manufacturing process as disclosed herein as part of the present invention for use in production of low-cost, uniform, efficient magneto-optic system elements provides an alternative waveguide technology that offers advantages over the prior art to enhance a responsiveness of a radiation-influencing property of the waveguide to an outside influence while reducing unit cost and increasing manufacturability, reproducibility, uniformity, and reliability.

BRIEF DESCRIPTION OF THE SEVERAL VIEWS OF THE DRAWING

FIG. 1 is a general schematic plan view of a preferred embodiment of the present invention;

FIG. 2 is a detailed schematic plan view of a specific implementation of the preferred embodiment shown in FIG. 1;

FIG. 3 is an end view of the preferred embodiment shown in FIG. 2;

FIG. 4 is a schematic block diagram of a preferred embodiment for a display assembly;

FIG. 5 is a view of one arrangement for output ports of the front panel shown in FIG. 4;

FIG. 6 is a schematic representation of a preferred embodiment of the present invention for a portion of the structured waveguide shown in FIG. 2;

FIG. 7 is a schematic block diagram of a representative waveguide manufacturing system for making a preferred embodiment of a waveguide preform of the present invention; and FIG. 8 is a schematic diagram of a representative fiber drawing system for making a preferred embodiment of the present invention.

DETAILED DESCRIPTION OF THE INVENTION

The present invention relates to an alternative waveguide technology that offers advantages over the prior art to enhance a responsiveness of a radiation-influencing property of the waveguide to an outside influence while reducing unit cost and increasing manufacturability, reproducibility, uniformity, and reliability. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In the following description, three terms have particular meaning in the context of the present invention: (1) optical transport, (2) property influencer, and (3) extinguishing. For purposes of the present invention, an optical transport is a waveguide particularly adapted to enhance the property influencing characteristics of the influencer while preserving desired attributes of the radiation. In a preferred embodiment, the property of the radiation to be influenced includes its polarization rotation state and the influencer uses a Faraday Effect to control the polarization angle using a controllable, variable magnetic field propagated parallel to a transmission axis of the optical transport. The optical transport is constructed to enable the polarization to be controlled quickly using low magnetic field strength over very short optical paths. In some particular implementations, the optical transport includes optical fibers exhibiting high Verdet constants for the wavelengths of the transmitted radiation while concurrently preserving the waveguiding attributes of the fiber and otherwise providing for efficient construction of, and cooperative affectation of the radiation property(ies), by the property influencer.

The property influencer is a structure for implementing the property control of the radiation transmitted by the optical transport. In the preferred embodiment, the property influencer is operatively coupled to the optical transport, which in one implementation for an optical transport formed by an optical fiber having a core and one or more cladding layers, preferably the influencer is integrated into or on one or more of the cladding layers without significantly adversely altering the waveguiding attributes of the optical transport. In the preferred embodiment using the polarization property of transmitted radiation, the preferred implementation of the property influencer is a polarization influencing structure, such as a coil, coilform, or other structure capable of integration that supports/produces a Faraday Effect manifesting field in the optical transport (and thus affects the transmitted radiation) using one or more magnetic fields (one or more of which are controllable).

The structured waveguide of the present invention may serve in some embodiments as a transport in a modulator that controls an amplitude of propagated radiation. The radiation emitted by the modulator will have a maximum radiation amplitude and a minimum radiation amplitude, controlled by the interaction of the property influencer on the optical transport. Extinguishing simply refers to the minimum radiation amplitude being at a sufficiently low level (as appropriate for the particular embodiment) to be characterized as "off" or "dark" or other classification indicating an absence of radiation. In other words, in some applications a sufficiently low but detectable/discernable radiation amplitude may properly be identified as "extinguished" when that level meets the parameters for the implementation or embodiment. The present invention improves the response of the waveguide to the influencer by use of optically active constituents disposed in the guiding region during waveguide manufacture.

FIG. 1 is a general schematic plan view of a preferred embodiment of the present invention for a Faraday structured waveguide modulator 100. Modulator 100 includes an optical transport 105, a property influencer 110 operatively coupled to transport 105, a first property element 120, and a second property element 125.

Transport 105 may be implemented based upon many well-known optical waveguide structures of the art. For example, transport 105 may be a specially adapted optical fiber (conventional or PCF) having a guiding channel including a guiding region and one or more bounding regions (e.g., a core and one or more cladding layers for the core), or transport 105 may be a waveguide channel of a bulk device or substrate having one or more such guiding channels. A conventional waveguide structure is modified based upon the type of radiation property to be influenced and the nature of influencer 110.

Influencer 110 is a structure for manifesting property influence (directly or indirectly such as through the disclosed effects) on the radiation transmitted through transport 105 and/or on transport 105. Many different types of radiation properties may be influenced, and in many cases a particular structure used for influencing any given property may vary from implementation to implementation. In the preferred embodiment, properties that may be used in turn to control an output amplitude of the radiation are desirable properties for influence. For example, radiation polarization angle is one property that may be influenced and is a property that may be used to control a transmitted amplitude of the radiation. Use of another element, such as a fixed polarizer will control radiation amplitude based upon the polarization angle of the radiation compared to the transmission axis of the polarizer. Controlling the polarization angle varies the transmitted radiation in this example.

However, it is understood that other types of properties may be influenced as well and may be used to control output amplitude, such as for example, radiation phase or radiation frequency. Typically, other elements are used with modulator 100 to control output amplitude based upon the nature of the property and the type and degree of the influence on the property. In some embodiments another characteristic of the radiation may be desirably controlled rather than output amplitude, which may require that a radiation property other than those identified be controlled, or that the property may need to be controlled differently to achieve the desired control over the desired attribute.

A Faraday Effect is but one example of one way of achieving polarization control within transport 105. A preferred embodiment of influencer 110 for Faraday polarization rotation influence uses a combination of variable and fixed magnetic fields proximate to or integrated within/on transport 105. These magnetic fields are desirably generated so that a controlling magnetic field is oriented parallel to a propagation direction of radiation transmitted through transport 105. Properly controlling the direction and magnitude of the magnetic field relative to the transport achieves a desired degree of influence on the radiation polarization angle.

It is preferable in this particular example that transport 105 be constructed to improve/maximize the "influencibility" of the selected property by influencer 110. For the polarization rotation property using a Faraday Effect, transport 105 is doped, formed, processed, and/or treated to increase/maximize the Verdet constant. The greater the Verdet constant, the easier influencer 110 is able to influence the polarization rotation angle at a given field strength and transport length. In the preferred embodiment of this implementation, attention to the Verdet constant is the primary task with other features/attributes/characteristics of the waveguide aspect of transport 105 secondary. In the preferred embodiment, influencer 110 is integrated or otherwise "strongly associated" with transport 105 through the waveguide manufacturing process (e.g., the preform fabrication and/or drawing process), though some implementations may provide otherwise.

Element 120 and element 125 are property elements for selecting/filtering/operating on the desired radiation property to be influenced by influencer 110. Element 120 may be a filter to be used as a "gating" element to pass wave components of the input radiation having a desired state for the appropriate property, or it may be a "processing" element to conform one or more wave components of the input radiation to a desired state for the appropriate property. The gated/processed wave components from element 120 are provided to optical transport 105 and property influencer 110 controllably influences the transported wave components as described above.

Element 125 is a cooperative structure to element 120 and operates on the influenced wave components. Element 125 is a structure that passes WAVE_OUT and controls an amplitude of WAVE_OUT based upon a state of the property of the wave component. The nature and particulars of that control relate to the influenced property and the state of the property from element 120 and the specifics of how that initial state has been influenced by influencer 110.

For example, when the property to be influenced is a polarization property/polarization rotation angle of the wave components, element 120 and element 125 may be polarization filters. Element 120 selects one specific type of polarization for the wave component, for example right hand circular polarization. Influencer 110 controls a polarization rotation angle of radiation as it passes through transport 105. Element 125 filters the influenced wave component based upon the final polarization rotation angle as compared to a transmission angle of element 125. In other words, when the polarization rotation angle of the influenced wave component matches the transmission axis of element 125, WAVE_OUT has a high amplitude. When the polarization rotation angle of the influenced wave component is "crossed" with the transmission axis of element 125, WAVE_OUT has a low amplitude. A cross in this context refers to a rotation angle about ninety degrees misaligned with the transmission axis for conventional polarization filters.

Further, it is possible to establish the relative orientations of element 120 and element 125 so that a default condition results in a maximum amplitude of WAVE_OUT, a minimum amplitude of WAVE_OUT, or some value in between. A default condition refers to a magnitude of the output amplitude without influence from influencer 110. For example, by setting the transmission axis of element 125 at a ninety degree relationship to a transmission axis of element 120, the default condition would be a minimum amplitude for the preferred embodiment.

Element 120 and element 125 may be discrete components or one or both structures may be integrated onto or into transport 105. In some cases, the elements may be localized at an "input" and an "output" of transport 105 as in the preferred embodiment, while in other embodiments these elements may be distributed in particular regions of transport 105 or throughout transport 105.

In operation, radiation (shown as WAVE_IN) is incident to element 120 and an appropriate property (e.g., a right hand circular polarization (RCP) rotation component) is gated/processed to pass an RCP wave component to transport 105. Transport 105 transmits the RCP wave component until it is interacted with by element 125 and the wave component (shown as WAVE_OUT) is passed. Incident WAVE_IN typically has multiple orthogonal states to the polarization property (e.g., right hand circular polarization (RCP) and left hand circular polarization (LCP)). Element 120 produces a particular state for the polarization rotation property (e.g., passes one of the orthogonal states and blocks/shifts the other so only one state is passed). Influencer 110, in response to a control signal, influences that particular polarization rotation of the passed wave component and may change it as specified by the control signal. Influencer 110 of the preferred embodiment is able to influence the polarization rotation property over a range of about ninety degrees. Element 125 then interacts with the wave component as it has been influenced permitting the radiation amplitude of WAVE_IN to be modulated from a maximum value when the wave component polarization rotation matches the transmission axis of element 125 and a minimum value when the wave component polarization is "crossed" with the transmission axis. By use of element 120, the amplitude of WAVE_OUT of the preferred embodiment is variable from a maximum level to an extinguished level.

FIG. 2 is a detailed schematic plan view of a specific implementation of the preferred embodiment shown in FIG. 1. This implementation is described specifically to simplify the discussion, though the invention is not limited to this particular example. Faraday structured waveguide modulator 100 shown in FIG. 1 is a Faraday optical modulator 200 shown in FIG. 2.

Modulator 200 includes a core 205, a first cladding layer 210, a second cladding layer 215, a coil or coilform 220 (coil 220 having a first control node 225 and a second control node 230), an input element 235, and an output element 240. FIG. 3 is a sectional view of the preferred embodiment shown in FIG. 2 taken between element 235 and element 240 with like numerals showing the same or corresponding structures.

Core 205 may contain one or more of the following dopants added by standard fiber manufacturing techniques, e.g., variants on the vacuum deposition method: (a) color dye dopant (makes modulator 200 effectively a color filter alight from a source illumination system), and (b) an optically-active dopant, such as YIG/Bi—YIG or Tb or TGG or other dopant for increasing the Verdet constant of core 205 to achieve efficient Faraday rotation in the presence of an activating magnetic field. Heating or applying stress to the fiber during manufacturing adds holes or irregularities in core 205 to further increase the Verdet constant and/or implement non-linear effects. To simplify the discussion herein, the discussion focuses predominately on non-PCF waveguides. However, in the context of this discussion, PCF variants may be substituted for the non-PCF wavelength embodiments unless the context clearly is contrary to such substitution. For PCF waveguides, rather than use color dye dopants, color filtering is implemented using wavelength-selective bandgap coupling or longitudinal structures/voids may be filled and doped. Therefore, whenever color filtering/dye-doping is discussed in connection with non-PCF waveguides, the use of wavelength-selective bandgap coupling and/or filling and doping for PCF waveguides may also be substituted when appropriate.

Much silica optical fiber is manufactured with high levels of dopants relative to the silica percentage (this level may be as high as fifty percent dopants). Current dopant concentrations in silica structures of other kinds of fiber achieve about ninety-degree rotation in a distance of tens of microns. Conventional fiber manufacturers continue to achieve improvements in increasing dopant concentration (e.g., fibers commercially available from JDS Uniphase) and in controlling dopant profile (e.g., fibers commercially available from Corning Incorporated). Core 205 achieves sufficiently high and controlled concentrations of optically active dopants to provide requisite quick rotation with low power in micron-scale distances, with these power/distance values continuing to decrease as further improvements are made.

First cladding layer 210 (optional in the preferred embodiment) is doped with ferro-magnetic single-molecule magnets, which become permanently magnetized when exposed to a strong magnetic field. Magnetization of first cladding layer 210 may take place prior to the addition to core 205 or pre-form, or after modulator 200 (complete with core, cladding, coating(s) and/or elements) is drawn. During this process, either the preform or the drawn fiber passes through a strong permanent magnet field ninety degrees offset from a transmission axis of core 205. In the preferred embodiment, this magnetization is achieved by an electro-magnetic disposed as an element of a fiber pulling apparatus. First cladding layer 210 (with permanent magnetic properties) is provided to saturate the magnetic domains of the optically-active core 205, but does not change the angle of rotation of the radiation passing through fiber 200, since the direction of the magnetic field from layer 210 is at right-angles to the direction of propagation. The incorporated provisional application describes a method to optimize an orientation of a doped ferromagnetic cladding by pulverization of non-optimal nuclei in a crystalline structure.

As single-molecule magnets (SMMs) are discovered that may be magnetized at relative high temperatures, the use of these SMMs will be preferable as dopants. The use of these SMMs allow for production of superior doping concentrations and dopant profile control. Examples of commercially available single-molecule magnets and methods are available from ZettaCore, Inc. of Denver, Colo.

Second cladding layer 215 is doped with a ferrimagnetic or ferromagnetic material and is characterized by an appropriate hysteresis curve. The preferred embodiment uses a "short" curve that is also "wide" and "flat," when generating the requisite field. When second cladding layer 215 is saturated by a magnetic field generated by an adjacent field-generating element (e.g., coil 220), itself driven by a signal (e.g., a control pulse) from a controller such as a switching matrix drive circuit (not shown), second cladding layer 215 quickly reaches a degree of magnetization appropriate to the degree of rotation desired for modulator 200. Further, second cladding layer 215 remains magnetized at or sufficiently near that level until a subsequent pulse either increases (current in the same direction), refreshes (no current or a +/− maintenance current), or reduces (current in the opposite direction) the magnetization level. This remanent flux of doped second cladding layer 215 maintains an appropriate degree of rotation over time without constant application of a field by influencer 110 (e.g., coil 220).

Appropriate modification/optimization of the doped ferri/ferromagnetic material may be further effected by ionic bombardment of the cladding at an appropriate process step. Reference is made to U.S. Pat. No. 6,103,010 entitled "METHOD OF DEPOSITING A FERROMAGNETIC FILM ON A WAVEGUIDE AND A MAGNETO-OPTIC COMPONENT COMPRISING A THIN FERROMAGNETIC FILM DEPOSITED BY THE METHOD" and assigned to Alcatel of Paris, France in which ferromagnetic thin-films deposited by vapor-phase methods on a waveguide are bombarded by ionic beams at an angle of incidence that pulverizes nuclei not ordered in a preferred crystalline structure. Alteration of crystalline structure is a method known to the art, and may be employed on a doped silica cladding, either in a fabricated fiber or on a doped preform material. The '010 patent is hereby expressly incorporated by reference for all purposes.

Similar to first cladding layer 210, suitable single-molecule magnets (SMMs) that are developed and which may be magnetized at relative high temperatures will be preferable as dopants in the preferred embodiment for second cladding layer 215 to allow for superior doping concentrations.

Coil 220 of the preferred embodiment is fabricated integrally on or in fiber 200 to generate an initial magnetic field. This magnetic field from coil 220 rotates the angle of polarization of radiation transmitted through core 205 and magnetizes the ferri/ferromagnetic dopant in second cladding layer 215. A combination of these magnetic fields maintains the desired angle of rotation for a desired period (such a time of a video frame when a matrix of fibers 200 collectively form a display as described in one of the related patent applications incorporated herein). For purposes of the present discussion, a "coilform" is defined as a structure similar to a coil in that a plurality of conductive segments are disposed parallel to each other and at right-angles to the axis of the fiber. As materials performance improves—that is, as the effective Verdet constant of a doped core increases by virtue of dopants of higher Verdet constant (or as augmented structural modifications, including those introducing non-linear effects)—the need for a coil or "coilform" surrounding the fiber element may be reduced or obviated, and simpler single bands or Gaussian cylinder structures will be practical. These structures (including the cylinder structures and coils and other similar structures), when serving the functions of the coilform described herein, are also included within the definition of coilform. The term coil and coilform may be used interchangeably when the context permits.

When considering the variables of the equation specifying the Faraday Effect: field strength, distance over which the field is applied, and the Verdet constant of the rotating medium, one consequence is that structures, components, and/or devices using modulator 200 are able to compensate for a coil or coilform formed of materials that produce less intense magnetic fields. Compensation may be achieved by making modulator 200 longer, or by further increasing/improving the effective Verdet constant. For example, in some implementations, coil 220 uses a conductive material that is a conductive polymer that is less efficient than a metal wire. In other implementations, coil 220 uses wider but fewer windings than otherwise would be used with a more efficient material. In still other instances, such as when coil 220 is fabricated by a convenient process but produces coil 220 having a less efficient operation, other parameters compensate as necessary to achieve suitable overall operation.

There are tradeoffs between design parameters—fiber length, Verdet constant of core, and peak field output and efficiency of the field-generating element. Taking these tradeoffs into consideration produces four preferred embodiments of an integrally-formed coilform, including: (1) twisted fiber to implement a coil/coilform, (2) fiber wrapped epitaxially with a thin film printed with conductive patterns to achieve multiple layers of windings, (3) printed by dip-pen nanolithography on fiber to fabricate a coil/coilform, and (4) coil/coilform wound with coated/doped glass fiber, or alternatively a conductive polymer that is metallically coated or uncoated, or a metallic wire. Further details of these embodiments are described in the related and incorporated provisional patent application referenced above.

Node 225 and node 230 receive a signal for inducing generation of the requisite magnetic fields in core 205, cladding layer 215, and coil 220. This signal in a simple embodiment is a DC (direct current) signal of the appropriate magnitude and duration to create the desired magnetic fields and rotate the polarization angle of the WAVE_IN radiation propagating through modulator 200. A controller (not shown) may provide this control signal when modulator 200 is used.

Input element 235 and output element 240 are polarization filters in the preferred embodiment, provided as discrete components or integrated into/onto core 205. Input element 235, as a polarizer, may be implemented in many different ways. Various polarization mechanisms may be employed that permit passage of light of a single polarization type (specific circular or linear) into core 205; the preferred embodiment uses a thin-film deposited epitaxially on an "input" end of core 205. An alternate preferred embodiment uses commercially available nano-scale microstructuring techniques on waveguide 200 to achieve polarization filtering (such as modification to silica in core 205 or a cladding layer as described in the incorporated Provisional Patent Application.) In some implementations for efficient input of light from one or more light source(s), a preferred illumination system may include a cavity to allow repeated reflection of light of the "wrong" initial polarization; thereby all light ultimately resolves into the admitted or "right" polarization. Optionally, especially depending on the distance from the illumination source to modulator 200, polarization-maintaining waveguides (fibers, semiconductor) may be employed.

Output element 240 of the preferred embodiment is a "polarization filter" element that is ninety degrees offset from the orientation of input element 235 for a default "off" modulator 200. (In some embodiments, the default may be made "on" by aligning the axes of the input and output elements. Similarly, other defaults such as fifty percent amplitude may be implemented by appropriate relationship of the input and output elements and suitable control from the influencer.) Element 240 is preferably a thin-film deposited epitaxially on an output end of core 205. Input element 235 and output element 240 may be configured differently from the configurations described here using other polarization filter/control systems. When the radiation property to be influenced includes a property other than a radiation polarization angle (e.g., phase or frequency), other input and output functions are used to properly gate/process/filter the desired property as described above to modulate the amplitude of WAVE_OUT responsive to the influencer.

FIG. 4 is a schematic block diagram of a preferred embodiment for a display assembly 400. Assembly 400 includes an aggregation of a plurality of picture elements (pixels) each generated by a waveguide modulator $200_{i,j}$ such as shown in FIG. 2. Control signals for control of each influencer of modulators $200_{i,j}$ are provided by a controller 405. A radiation source 410 provides source radiation for input/control by modulators $200i,j$ and a front panel may be used to arrange modulators $200_{i,j}$ into a desired pattern and or optionally provide post-output processing of one or more pixels.

Radiation source 410 may be unitary balanced-white or separate RGB/CMY tuned source or sources or other appropriate radiation frequency. Source(s) 410 may be remote from input ends of modulator $200_{i,j}$, adjacent these input ends, or integrated onto/into modulator $200_{i,j}$. In some implementations, a single source is used, while other implementations may use several or more (and in some cases, one source per modulator $200_{i,j}$).

As discussed above, the preferred embodiment for the optical transport of modulator $200_{i,j}$ includes light channels in the form of special optical fibers. But semiconductor waveguide, waveguiding holes, or other optical waveguiding channels, including channels or regions formed through material "in depth," are also encompassed within the scope of the present invention. These waveguiding elements are fundamental imaging structures of the display and incorporate, integrally, amplitude modulation mechanisms and color selection mechanisms. In the preferred embodiment for an FPD implementation, a length of each of the light channels is preferably on the order of about tens of microns (though the length may be different as described herein).

It is one feature of the preferred embodiment that a length of the optical transport is short (on the order of about 20 mm and shorter), and able to be continually shortened as the effective Verdet value increases and/or the magnetic field strength increases. The actual depth of a display will be a function of the channel length but because optical transport is a waveguide, the path need not be linear from the source to the output (the path length). In other words, the actual path may be bent to provide an even shallower effective depth in some implementations. The path length, as discussed above, is a function of the Verdet constant and the magnetic field strength and while the preferred embodiment provides for very short path lengths of a few millimeters and shorter, longer lengths may be used in some implementations as well. The necessary length is determined by the influencer to achieve the desired degree of influence/control over the input radiation. In the preferred embodiment for polarized radiation, this control is able to achieve about a ninety degree rotation. In some applications, when an extinguishing level is higher (e.g., brighter) then less rotation may be used which shortens the necessary path length. Thus, the path length is also influenced by the degree of desired influence on the wave component.

Controller 405 includes a number of alternatives for construction and assembly of a suitable switching system.

The preferred implementation includes not only a point-to-point controller, it also encompasses a "matrix" that structurally combines and holds modulators $200i,j$, and electronically addresses each pixel. In the case of optical fibers, inherent in the nature of a fiber component is the potential for an all-fiber, textile construction and appropriate addressing of the fiber elements. Flexible meshes or solid matrixes are alternative structures, with attendant assembly methods.

It is one feature of the preferred embodiment that an output end of one or more modulators $200_{i,j}$ may be processed to improve its application. For example, the output ends of the waveguide structures, particularly when implemented as optical fibers, may be heat-treated and pulled to form tapered ends or otherwise abraded, twisted, or shaped for enhanced light scattering at the output ends, thereby improving viewing angle at the display surface. Some and/or all of the modulator output ends may be processed in similar or dissimilar ways to collectively produce a desired output structure achieving the desired result. For example, various focus, attenuation, color or other attribute(s) of the WAVE_OUT from one or more pixels may be controlled or affected by the processing of one or more output ends/corresponding panel location(s).

Front panel 415 may be simply a sheet of optical glass or other transparent optical material facing the polarization component or it may include additional functional and structural features. For example, panel 415 may include guides or other structures to arrange output ends of modulators $200_{i,j}$ into the desired relative orientation with neighboring modulators $200_{i,j}$. FIG. 5 is a view of one arrangement for output ports $500_{x,y}$ of front panel 415 shown in FIG. 4. Other arrangements are possible are also possible depending upon the desired display (e.g., circular, elliptical or other regular/irregular geometric shape). When an application requires it, the active display area does not have to be contiguous pixels such that rings or "doughnut" displays are possible when appropriate. In other implementations, output ports may focus, disperse, filter, or perform other type of post-output processing on one or more pixels.

An optical geometry of a display or projector surface may itself vary in which waveguide ends terminate to a desired three-dimensional surface (e.g., a curved surface) which allows additional focusing capacity in sequence with additional optical elements and lenses (some of which may be included as part of panel 415). Some applications may require multiple areas of concave, flat, and/or convex surface regions, each with different curvatures and orientations with the present invention providing the appropriate output shape. In some applications, the specific geometry need not be fixed but may be dynamically alterable to change shapes/orientations/dimensions as desired. Implementations of the present invention may produce various types of haptic display systems as well.

In projection system implementations, radiation source 410, a "switching assembly" with controller 405 coupled to modulators $200_{i,j}$, and front panel 415 may benefit from being housed in distinct modules or units, at some distance from each other. Regarding radiation source 410, in some embodiments it is advantageous to separate the illumination source(s) from the switching assembly due to heat produced by the types of high-amplitude light that is typically required to illuminate a large theatrical screen. Even when multiple illumination sources are used, distributing the heat output otherwise concentrated in, for instance, a single Xenon lamp, the heat output may still be large enough that the separation from the switching and display elements may be desirable. The illumination source(s) thus would be housed in an insulated case with heat sink and cooling elements. Fibers would then convey the light from the separate or unitary source to the switching assembly, and then projected onto the screen. The screen may include some features of front panel 415 or panel 415 may be used prior to illuminating an appropriate surface.

The separation of the switching assembly from the projection/display surface may have its own advantages. Placing the illumination and switching assembly in a projection system base (the same would hold true for an FPD) is able to reduce the depth of a projection TV cabinet. Or, the projection surface may be contained in a compact ball at the top of a thin lamp-like pole or hanging from the ceiling from a cable, in front projection systems employing a reflective fabric screen.

For theatrical projection, the potential to convey the image formed by the switching assembly, by means of waveguide structures from a unit on the floor, up to a compact final-optics unit at the projection window area, suggests a space-utilization strategy to accommodate both a traditional film projector and a new projector of the preferred embodiment in the same projection room, among other potential advantages and configurations.

A monolithic construction of waveguide strips, each with multiple thousands of waveguides on a strip, arranged or adhered side by side, may accomplish hi-definition imaging. However, "bulk" fiber optic component construction may also accomplish the requisite small projection surface area in the preferred embodiment. Single-mode fibers (especially without the durability performance requirements of external telecommunications cable) have a small enough diameter that the cross-sectional area of a fiber is quite small and suitable as a display pixel or sub-pixel.

In addition, integrated optics manufacturing techniques are expected to permit attenuator arrays of the present invention to be accomplished in the fabrication of a single semiconductor substrate or chip, massively monolithic or superficial.

In a fused-fiber projection surface, the fused-fiber surface may be then ground to achieve a curvature for the purpose of focusing an image into an optical array; alternatively, fiber-ends that are joined with adhesive or otherwise bound may have shaped tips and may be arranged at their terminus in a shaped matrix to achieve a curved surface, if necessary.

For projection televisions or other non-theatrical projection applications, the option of separating the illumination and switching modules from the projector surface enables novel ways of achieving less-bulky projection television cabinet construction.

FIG. 6 is a schematic representation of a preferred embodiment of the present invention for a portion 600 of the structured waveguide 205 shown in FIG. 2. Portion 600 is a radiation propagating channel of waveguide 205, typically a guiding channel (e.g., a core for a fiber waveguide) but may include one or more bounding regions (e.g., claddings for the fiber waveguide). Other waveguiding structures have different specific mechanisms for enhancing the waveguiding of radiation propagated along a transmission axis of a channel region of the waveguide. Waveguides include photonic crystal fibers, special thin-film stacks of structured materials and other materials. The specific mechanisms of waveguiding may vary from waveguide to waveguide, but the present invention may be adapted for use with the different structures.

For purposes of the present invention, the terms guiding region or guiding channel and bounding regions refer to cooperative structures for enhancing radiation propagation along the transmission axis of the channel. These structures are different from buffers or coatings or post-manufacture treatments of the waveguide. A principle difference is that the bounding regions are typically capable of propagating the wave component propagated through the guiding region while the other components of a waveguide do not. For example, in a multimode fiber optic waveguide, significant energy of higher-order modes is propagated through the bounding regions. One point of distinction is that the guiding region/bounding region(s) are substantially transparent to propagating radiation while the other supporting structures are generally substantially opaque.

As described above, influencer 110 works in cooperation with waveguide 205 to influence a property of a propagating wave component as it is transmitted along the transmission axis. Portion 600 is therefore said to have an influencer response attribute, and in the preferred embodiment this attribute is particularly structured to enhance the response of the property of the propagating wave to influencer 110. Portion 600 includes a plurality of constituents (e.g., rare-earth dopants 605, holes, 610, structural irregularities 615, microbubbles 620, and/or other elements 625) disposed in the guiding region and/or one or more bounding regions as desirable for any specific implementation. In the preferred embodiment, portion 600 has a very short length, in many cases less than about 25 millimeters, and as described above, sometimes significantly shorter than that. The influencer response attribute enhanced by these constituents is optimized for short length waveguides (for example as contrasted to telecommunications fibers optimized for very long lengths on the order of kilometers and greater, including attenuation and wavelength dispersion). The constituents of portion 600, being optimized for a different application, could seriously degrade telecommunications use of the waveguide. While the presence of the constituents is not intended to degrade telecommunications use, the focus of the preferred embodiment on enhancement of the influencer response attribute over telecommunications attribute(s) makes it possible for such degradation to occur and is not a drawback of the preferred embodiment.

The present invention contemplates that there are many different wave properties that may be influenced by different constructions of influencer 110; the preferred embodiment targets a Faraday-effect-related property of portion 600. As discussed above, the Faraday Effect induces a polarization rotation change responsive to a magnetic field parallel to a propagation direction. In the preferred embodiment, when influencer 110 generates a magnetic field parallel to the transmission axis, in portion 600 the amount of rotation is dependent upon the strength of the magnetic field, the length of portion 600, and the Verdet constant for portion 600. The constituents increase the responsiveness of portion 600 to this magnetic field, such as by increasing the effective Verdet constant of portion 600.

One significance of the paradigm shift in waveguide manufacture and characteristics by the present invention is that modification of manufacturing techniques used to make kilometer-lengths of optically-pure telecommunications grade waveguides enables manufacture of inexpensive kilometer-lengths of potentially optically-impure (but optically-active) influencer-responsive waveguides. As discussed above, some implementations of the preferred embodiment may use a myriad of very short lengths of waveguides modified as disclosed herein. Cost savings and other efficiencies/merits are realized by forming these collections from short length waveguides created from (e.g., cleaving) the longer manufactured waveguide as described herein. These cost savings and other efficiencies and merits include the advantages of using mature manufacturing techniques and equipment that have the potential to overcome many of the drawbacks of magneto-optic systems employing discrete conventionally produced magneto-optic crystals as system elements. For example, these drawbacks include a high cost of production, a lack of uniformity across a large number of magneto-optic crystals and a relatively large size of the individual components that limits the size of collections of individual components.

The preferred embodiment includes modifications to fiber waveguides and fiber waveguide manufacturing methodologies. At its most general, an optical fiber is a filament of transparent (at the wavelength of interest) dielectric material (typically glass or plastic) and usually circular in cross section that guides light. For early optical fibers, a cylindrical core was surrounded by, and in intimate contact with, a cladding of similar geometry. These optical fibers guided light by providing the core with slightly greater refractive index than that of the cladding layer. Other fiber types provide different guiding mechanisms—one of interest in the context of the present invention includes photonic crystal fibers (PCF) as described above.

Silica (silicon dioxide ($SiO_2$)) is the basic material of which the most common communication-grade optical fibers are made. Silica may occur in crystalline or amorphous form, and occurs naturally in impure forms such as quartz and sand. The Verdet constant is an optical constant that describes the strength of the Faraday Effect for a particular material. The Verdet constant for most materials, including silica is extremely small and is wavelength dependent. It is very strong in substances containing paramagnetic ions such as terbium (Tb). High Verdet constants are found in terbium doped dense flint glasses or in crystals of terbium gallium garnet (TGG). This material generally has excellent transparency properties and is very resistant to laser damage. Although the Faraday Effect is not chromatic (i.e. it doesn't depend on wavelength), the Verdet constant is quite strongly a function of wavelength. At 632.8 nm, the Verdet constant for TGG is reported to be −134 radT−1 whereas at 1064 nm, it has fallen to −40radT−1. This behavior means that the devices manufactured with a certain degree of rotation at one wavelength, will produce much less rotation at longer wavelengths.

The constituents may, in some implements, include an optically-active dopant, such as YIG/Bi—YIG or Tb or TGG or other best-performing dopant, which increases the Verdet constant of the waveguide to achieve efficient Faraday rotation in the presence of an activating magnetic field. Heating or stressing during the fiber manufacturing process as described below may further increase the Verdet constant by adding additional constituents (e.g., holes or irregularities) in portion 600. Rare-earths as used in conventional waveguides are employed as passive enhancements of transmission attributes elements, and are not used in optically-active applications.

Since silica optical fiber is manufactured with high levels of dopants relative to the silica percentage itself, as high as at least 50% dopants, and since requisite dopant concentrations have been demonstrated in silica structures of other kinds to achieve 90° rotation in tens of microns or less; and given improvements in increasing dopant concentrations (e.g., fibers commercially available from JDS Uniphase) and improvements in controlling dopant profiles (e.g., fibers, commercially available from Corning Incorporated), it is possible to achieve sufficiently high and controlled concentrations of optically-active dopant to induce rotation with low power in micron-scale distances.

FIG. 7 is a schematic block diagram of a representative waveguide manufacturing system 700 for making a preferred embodiment of a waveguide preform of the present invention. System 700 represents a modified chemical vapor deposition (MCVD) process to produce a glass rod referred to as the preform. The preform from a conventional process is a solid rod of ultra-pure glass, duplicating the optical properties of a desired fiber exactly, but with linear dimensions scaled-up two orders of magnitude or more. However, system 700 produces a preform that does not emphasize optical purity but optimizes for short-length optimization of influencer response. Preforms are typically made using one of the following chemical vapor deposition (CVD) methods: 1. Modified Chemical Vapor Deposition (MCVD), 2. Plasma Modified Chemical Vapor Deposition (PMCVD), 3. Plasma Chemical Vapor Deposition (PCVD), 4. Outside Vapor Deposition (OVD), 5. Vapor-phase Axial Deposition (AVD). All these methods are based on thermal chemical vapor reaction that forms oxides, which are deposited as layers of glass particles called soot, on the outside of a rotating rod or inside a glass tube. The same chemical reactions occur in these methods.

Various liquids (e.g., starting materials are solutions of $SiCl_4$, $GeCl_4$, $POCl_3$, and gaseous $BCl_3$) that provide the source for Si and dopants are heated in the presence in oxygen gas, each liquid in a heated bubbler 705 and gas from a source 710. These liquids are evaporated within an oxygen stream controlled by a mass-flow meter 715 and, with the gasses, form silica and other oxides from combustion of the glass-producing halides in a silica-lathe 720. Chemical reactions called oxidizing reactions occur in the vapor phase, as listed below:

$$GeCl_4 + O_2 => GeO_2 + 2Cl_2$$

$$SiCl_4 + O_2 => SiO_2 + 2Cl_2$$

$$4POCl_3 + 3O_2 => 2P_2O_5 + 6Cl_2$$

$$4BCl_3 + 3O_2 => 2B_2O_3 + 6Cl_2$$

Germanium dioxide and phosphorus pentoxide increase the refractive index of glass, a boron oxide—decreases it. These oxides are known as dopants. Other bubblers 705 including suitable constituents for enhancing the influencer response attribute of the preform may be used in addition to those shown.

Changing composition of the mixture during the process influences a refractive index profile and constituent profile of the preform. The flow of oxygen is controlled by mixing valves 715, and reactant vapors 725 are blown into silica pipe 730 that includes a heated tube 735 where oxidizing takes places. Chlorine gas 740 is blown out of tube 735, but the oxide compounds are deposited in the tube in the form of soot 745. Concentrations of iron and copper impurity is reduced from about 10 ppb in the raw liquids to less than 1 ppb in soot 745.

Tube 735 is heated using a traversing $H_2O_2$ burner 750 and is continually rotated to vitrify soot 745 into a glass 755. By adjusting the relative flow of the various vapors 725, several layers with different indices of refraction are obtained, for example core versus cladding or variable core index profile for GI fibers. After the layering is completed, tube 735 is heated and collapsed into a rod with a round, solid cross-section, called the preform rod. In this step it is essential that center of the rod be completely filled with material and not hollow. The preform rod is then put into a furnace for drawing, as will be described in cooperation with FIG. 8.

The main advantage of MCVD is that the reactions and deposition occur in a closed space, so it is harder for undesired impurities to enter. The index profile of the fiber is easy to control, and the precision necessary for SM fibers can be achieved relatively easily. The equipment is simple to construct and control. A potentially significant limitation of the method is that the dimensions of the tube essentially limit the rod size. Thus, this technique forms fibers typically of 35 km in length, or 20–40 km at most. In addition, impurities in the silica tube, primarily $H_2$ and OH—, tend to diffuse into the fiber. Also, the process of melting the deposit to eliminate the hollow center of the preform rod sometimes causes a depression of the index of refraction in the core, which typically renders the fiber unsuitable for telecommunications use but is not generally of concern in the context of the present invention. In terms of cost and expense, the main disadvantage of the method is that the deposition rate is relatively slow because it employs indirect heating, that is tube 735 is heated, not the vapors directly, to initiate the oxidizing reactions and to vitrify the soot. The deposition rate is typically 0.5 to 2 g/min.

A variation of the above-described process makes rare-earth doped fibers. To make a rare-earth doped fiber, the process starts with a rare-earth doped preform—typically fabricated using a solution doping process. Initially, an optical cladding, consisting primarily of fused silica, is deposited on an inside of the substrate tube. Core material, which may also contain germanium, is then deposited at a reduced temperature to form a diffuse and permeable layer known as a 'frit'. After deposition of the frit, this partially-completed preform is sealed at one end, removed from the lathe and a solution of suitable salts of the desired rare-earth dopant (e.g., neodymium, erbium, ytterbium etc.) is introduced. Over a fixed period of time, this solution is left to permeate the frit. After discarding any excess solution, the preform is returned to the lathe to be dried and consolidated. During consolidation, the interstices within the frit collapse and encapsulate the rare-earth. Finally, the preform is subjected to a controlled collapse, at high temperature to form a solid rod of glass—with a rare-earth incorporated into the core. Generally inclusion of rare-earths in fiber cables are not optically-active, that is, respond to electric or magnetic or other perturbation or field to affect a characteristic of light propagating through the doped medium. Conventional systems are the results of ongoing quests to increase the percentage of rare-earth dopants driven by a goal to improve "passive" transmission characteristics of waveguides (including telecommunications attributes). But the increased percentages of dopants in waveguide core/boundaries is advantageous for affecting optical-activity of the compound medium/structure for the preferred embodiment. As discussed above, in the preferred embodiment the percentage of dopants vs. silica is at least fifty percent.

FIG. 8 is a schematic diagram of a representative fiber drawing system 800 for making a preferred embodiment of the present invention from a preform 805, such as one produced from system 700 shown in FIG. 7. System 800 converts preform 805 into a hair-thin filament, typically performed by drawing. Preform 805 is mounted into a feed mechanism 810 attached near a top of a tower 815. Mechanism 810 lowers preform 805 until a tip enters into a high-purity graphite furnace 820. Pure gasses are injected into the furnace to provide a clean and conductive atmosphere. In furnace 820, tightly controlled temperatures approaching 1900° C. soften the tip of preform 805. Once the softening point of the preform tip is reached, gravity takes over and allows a molten gob to "free fall" until it has been stretched into a thin strand.

An operator threads this strand of fiber through a laser micrometer 825 and a series of processing stations 830x (e.g., for coatings and buffers) for producing a transport 835 that is wound onto a spool by a tractor 840, and the drawing process begins. The fiber is pulled by tractor 840 situated at the bottom of draw tower 815 and then wound on winding drums. During the draw, preform 805 is heated at the optimum temperature to achieve an ideal drawing tension. Draw speeds of 10–20 meters per second are not uncommon in the industry.

During the draw process the diameter of the drawn fiber is controlled to 125 microns within a tolerance of only 1 micron. Laser-based diameter gauge 825 monitors the diameter of the fiber. Gauge 825 samples the diameter of the fiber at rates in excess of 750 times per second. The actual value of the diameter is compared to the 125 micron target. Slight deviations from the target are converted to changes in draw speeds and fed to tractor 840 for correction.

Processing stations 830x typically include dies for applying a two layer protective coating to the fiber—a soft inner coating and a hard outer coating. This two-part protective jacket provides mechanical protection for handling while also protecting a pristine surface of the fiber from harsh environments. These coatings are cured by ultraviolet lamps, as part of the same or other processing stations 830x. Other stations 830x may provide apparatus/systems for increasing the influencer response attribute of transport 835 as it passes through the station(s). For example, various mechanical stressors, ion bombardment or other mechanism for introducing the influencer response attribute enhancing constituents at the drawing stage.

After spooled, the drawn fiber is tested for suitable optical and geometrical parameters. For transmission fibers, a tensile strength is usually tested first to ensure that a minimal tensile strength for the fiber has been achieved. After the first test, many different tests are performed, which for transmission fibers includes tests for transmission attributes, including: attenuation (decrease in signal strength over distance), bandwidth (information-carrying capacity; an important measurement for multimode fiber), numerical aperture (the measurement of the light acceptance angle of a fiber), cut-off wavelength (in single-mode fiber the wavelength above which only a single mode propagates), mode field diameter (in single-mode fiber the radial width of the light pulse in the fiber; important for interconnecting), and chromatic dispersion (the spreading of pulses of light due to rays of different wavelengths traveling at different speeds through the core; in single-mode fiber this is the limiting factor for information carrying capacity).

As has been described herein, the preferred embodiment of the present invention uses an optic fiber as a transport and primarily implements amplitude control by use of the "linear" Faraday Effect. While the Faraday Effect is a linear effect in which a polarization rotational angular change of propagating radiation is directly related to a magnitude of a magnetic field applied in the direction of propagation based upon the length over which the field is applied and the Verdet constant of the material through which the radiation is propagated. Materials used in a transport may not, however, have a linear response to an inducing magnetic field, e.g., such as from an influencer, in establishing a desired magnetic field strength. In this sense, an actual output amplitude of the propagated radiation may be non-linear in response to an applied signal from controller and/or influencer magnetic field and/or polarization and/or other attribute or characteristic of a modulator or of WAVE_IN. For purposes of the present discussion, characterization of the modulator (or element thereof) in terms of one or more system variables is referred to as an attenuation profile of the modulator (or element thereof).

Fiber fabrication processes continue to advance, in particular with reference to improving a doping concentration and as well as improving manipulation of dopant profiles, periodic doping of fiber during a production run, and related processing activities. U.S. Pat. No. 6,532,774, Method of Providing a High Level of Rare Earth Concentrations in Glass Fiber Preforms, demonstrates improved processes for co-doping of multiple dopants. Successes in increasing the concentration of dopants are anticipated to directly improves the linear Verdet constant of doped cores, as well as the performance of doped cores to facilitate non-linear effects as well.

Any given attenuation profile may be tailored to a particular embodiment, such as for example by controlling a composition, orientation, and/or ordering of a modulator or element thereof. For example, changing materials making up transport may change the "influencibility" of the transport or alter the degree to which the influencer "influences" any particular propagating wave_component. This is but one example of a composition attenuation profile. A modulator of the preferred embodiment enables attenuation smoothing in which different waveguiding channels have different attenuation profiles. For example in some implementations having attenuation profiles dependent on polarization handedness, a modulator may provide a transport for left handed polarized wave_components with a different attenuation profile than the attenuation profile used for the complementary waveguiding channel of a second transport for right handed polarized wave_components.

There are additional mechanisms for adjusting attenuation profiles in addition to the discussion above describing provision of differing material compositions for the transports. In some embodiments wave_component generation/modification may not be strictly "commutative" in response to an order of modulator elements that the propagating radiation traverses from WAVE_IN to WAVE_OUT. In these instances, it is possible to alter an attenuation profile by providing a different ordering of the non-commutative elements. This is but one example of a configuration attenuation profile. In other embodiments, establishing differing "rotational bias" for each waveguiding channel creates different attenuation profiles. As described above, some transports are configured with a predefined orientation between an input polarizer and an output polarizer/analyzer. For example, this angle may be zero degrees (typically defining a "normally ON" channel) or it may be ninety degrees (typically defining a "normally OFF" channel). Any given channel may have a different response in various angular displacement regions (that is, from zero to thirty degrees, from thirty to sixty degrees, and from sixty to ninety degrees). Different channels may be biased (for example with default "DC" influencer signals) into different displacement regions with the influencer influencing the propagating wave_component about this biased rotation. This is but one example of an operational attenuation profile. Several reasons are present that support having multiple waveguiding channels and to tailor/match/complement attenuation profiles for the channels. These reasons include power saving, efficiency, and uniformity in WAVE_OUT.

It is a preferred embodiment to implement strategies and factors to reduce power requirements of a continuously-addressed display system. One such strategy is to use a superior Verdet constant of vapor gases by entrapping special vapor gases contained in micro-bubbles within transport segments. (This embodiment makes use of a linear Macaluso-Corbino effect, i.e., Faraday rotation in the proximity of absorption lines. See, for example "Resonant Magneto-Optical Rotation: New Twists in an Old Plot" by Dmitry Budker, et. al., Department of Physics, University of California Berkeley, Berkeley, Calif., 4 Jun. 2002, the disclosure of which is incorporated by reference in its entirety for all purposes.)

Implementation of such micro-bubbles may be implemented in conjunction with the employment of photonic crystal material (fiber, waveguide, channeled material, and the like). Appropriate quantities and types of gas vapor is provided within appropriates portions of the waveguiding channel. Investigating a variant of Faraday rotation in gas vapor (a resonant magneto-optic effect, or "linear Macaluso-Corbino effect"), the researchers demonstrated an orders-of-magnitude higher Verdet constant in the vapor, as opposed to a solid flint glass reference: Verdet constant, flint glass: $3 \times 10^{-5}$ Vs. Verdet constant, Resonant rubidium vapor: $10^4$.

Budker et al concluded that the effective improvement in Verdet constant ("per atom"), between the use of transparent, optically-active solids, and a gas vapor, (taking into account the difference in density), is on the order of $10^{20}$. Implementation of gas vapor in hollow, partial vacuum fiber (standard or photonic crystal), or sealed channels in photonic crystal would then reduce the required magnetic field strength per unit length (or reduce the length for a given magnetic field strength) or a combination of both.

Considering again the formula for Faraday rotation given above (Eq. (1) above), then an increase in effective Verdet constant from $3 \times 10^{-5}$ to $10^4$ means a reduction in the required length "l" and/or the required field or flux intensity, by a combined factor of, conservatively, $10^{-8}$. Thus, implementation of gas vapor as the rotating medium is able to reduce, for instance, the input current range to rotate 0–90 degrees from 0–50 milliamps to 0–5 microamps, ($10^6$ amps) and required length of rotator element from mm's or tens of microns, to fractions of microns.

In the preferred embodiment, this implementation provides fibers that are doped with gas bubbles, as in the case of standard fiber that is doped and later heat-treated by established means to form holes, thereby resulting in a cost-effectively manufactured PCF (photonic crystal fiber). Properly doped, rarified vapor gases are found in the resultant holes will enhance the overall Verdet constant of the transport. Optionally, gas bubbles may be introduced in the fiber perform stage by pressure injection and methods known and established in glass fabrication.

Implementation of a vapor for pumping and resonant cavities is thus achieved by introduction of micro-bubbles or cavities. This may be accomplished, for example, by the heat-treatment processes referenced elsewhere herein and in the incorporated patent applications, which in combination with addition of alkali dopant, may leach sufficient alkali molecules to result in a rarified alkali vapor in the micro-bubbles. Or, micro-bubbles may be introduced and unsuppressed at the preform stage, as disclosed elsewhere herein.

Statistical analysis can determine the power demand profile of a FLAT active-matrix/continuously-addressed device due to these considerations. It is, in any event, significantly less than an imaginary maximum of each sub-pixel of the display simultaneously at full Faraday rotation. By no means are all sub-pixels "on" for any given frame, and intensities for those "on" are, for various reasons, typically at some relatively small fraction of maximum. Regarding current requirements, 0–50 m.amps for 0–90° Rotation is considered a Minimum Spec It is also important to note that an example current range for 0–90° rotation has been given (0–50 m.amps) from performance specs of existing Faraday attenuator devices, but this performance spec is provided as a minimum, already clearly being superseded and surpassed by the state-of-the-art of reference devices for optical communications. It most importantly does not reflect the novel embodiments specified in the present invention, including the benefits from improved methods and materials technology. Performance improvements have been ongoing since the achievement of the specs cited, and if anything have been and will continue to be accelerating, further reducing this range.

The system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention, for example for the switching control, is as a routine in an operating system made up of programming steps or instructions resident in a memory of a computing system during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a preferred embodiment" or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Therefore the scope of the invention is to be determined solely by the appended claims.

What is claimed as new and desired to be protected by Letters Patent of the United States is:

1. A transport, comprising:
   a waveguide including a guiding region and one or more bounding regions for enhancing containment of transmitted radiation within said guiding region, a portion of said waveguide defining a plurality of voids; and
   a gas disposed in said plurality of voids to enhance an influencer response attribute of said waveguide, wherein said influencer response attribute includes a polarization angle rate of change responsive to an imposed magnetic field.

2. The transport of claim 1 wherein said waveguide is a photonic crystal fiber.

3. The transport of claim 1 wherein said influencer response attribute includes a Verdet constant of said waveguide.

4. A transport manufacturing method, the method comprising:
   a) forming a waveguide having a guiding region and one or more bounding regions for enhancing containment of transmitted radiation within said guiding region, a portion of said waveguide defining a plurality of voids; and
   b) disposing a gas in said plurality of voids to enhance an influencer response attribute of said waveguide, wherein said influencer response attribute includes a polarization angle rate of change responsive to an imposed magnetic field.

5. The manufacturing method of claim 4 wherein said disposing step b) includes injecting said gas.

6. The manufacturing method of claim 4 wherein said disposing step b) includes doping said waveguide with said gas and treating said waveguide to produce said plurality of voids having said gas disposed therein.

7. A method of operating a transport, comprising:
   a) propagating a radiation signal through a waveguide including a guiding region and one or more bounding regions for enhancing containment of transmitted radiation within said guiding region, a portion of said waveguide defining a plurality of voids; and
   b) enhancing, using a gas disposed in said plurality of voids, a response of said radiation signal to an influencer applying an influence on said waveguide, wherein said response includes a polarization angle rate of change of said radiation signal responsive to an imposed magnetic field.

8. A propagated signal on which is carried computer-executable instructions which when executed by a computing system performs a method, the method comprising:
   a) forming a waveguide having a guiding region and one or more bounding regions for enhancing containment of transmitted radiation within said guiding region, a portion of said waveguide defining a plurality of voids; and
   b) disposing a gas in said plurality of voids to enhance an influencer response attribute of said waveguide, wherein said influencer response attribute includes a polarization angle rate of change responsive to an imposed magnetic field.

9. A computer program product comprising a computer readable medium carrying program instructions for manufacturing a transport when executed using a computing system, the executed program instructions executing a method, the method comprising:
   a) propagating a radiation signal through a waveguide including a guiding region and one or more bounding regions for enhancing containment of transmitted radiation within said guiding region, a portion of said waveguide defining a plurality of voids; and
   b) enhancing, using a gas disposed in said plurality of voids, a response of said radiation signal to an influencer applying an influence on said waveguide, wherein said response includes a polarization angle rate of change of said radiation signal responsive to an imposed magnetic field.

* * * * *